US008616318B2

(12) United States Patent
Kotani et al.

(10) Patent No.: US 8,616,318 B2
(45) Date of Patent: Dec. 31, 2013

(54) MOUNTING ARRANGEMENT FOR MOUNTING COOLER UNIT TO WORK MACHINE

(71) Applicant: Kubota Corporation, Osaka (JP)

(72) Inventors: Shinsuke Kotani, Sakai (JP); Toyoaki Yasuda, Sakai (JP); Kenji Mitsui, Sakai (JP); Masanori Fujino, Sakai (JP)

(73) Assignee: Kubota Corporation, Osaka (JP)

(*) Notice: Subject to any disclaimer, the term of this patent is extended or adjusted under 35 U.S.C. 154(b) by 0 days.

(21) Appl. No.: 13/688,552

(22) Filed: Nov. 29, 2012

(65) Prior Publication Data
US 2013/0087398 A1   Apr. 11, 2013

Related U.S. Application Data

(63) Continuation of application No. 12/562,372, filed on Sep. 18, 2009, now Pat. No. 8,342,277.

(30) Foreign Application Priority Data

Mar. 11, 2009   (JP) ................................ 2009-058481

(51) Int. Cl.
*B60K 11/00* (2006.01)
(52) U.S. Cl.
USPC ........................................ 180/68.4; 180/68.6
(58) Field of Classification Search
USPC ..................... 180/68.4, 68.6; 165/41, 65
See application file for complete search history.

(56) References Cited

U.S. PATENT DOCUMENTS

| 1,484,748 | A | * | 2/1924 | Yeager | 180/68.4 |
| 1,648,804 | A | * | 11/1927 | Griese | 180/68.4 |
| 6,260,609 | B1 | * | 7/2001 | Takahashi | 165/69 |
| 6,648,088 | B2 | | 11/2003 | Gabioli | |
| 7,246,674 | B2 | | 7/2007 | Andritter et al. | |
| 7,370,690 | B2 | * | 5/2008 | Rasset et al. | 165/41 |
| 7,401,848 | B2 | | 7/2008 | Haboon et al. | |
| 7,426,909 | B2 | | 9/2008 | Keane et al. | |
| 7,950,443 | B2 | * | 5/2011 | Rasset et al. | 165/41 |
| 8,002,072 | B2 | * | 8/2011 | Schmahl | 180/274 |
| 2002/0139594 | A1 | | 10/2002 | Gabioli | |
| 2004/0188155 | A1 | * | 9/2004 | Fujieda | 180/68.4 |
| 2006/0213639 | A1 | | 9/2006 | Kobayashi et al. | |
| 2006/0219451 | A1 | | 10/2006 | Schmitt | |

FOREIGN PATENT DOCUMENTS

JP   2002294748 A   10/2002
JP   2004122897 A   4/2004

* cited by examiner

*Primary Examiner* — J. Allen Shriver, II
*Assistant Examiner* — Bridget Avery
(74) *Attorney, Agent, or Firm* — The Webb Law Firm

(57) ABSTRACT

A mounting arrangement for mounting a cooler unit to a work machine has a traveling device, a machine body frame, an engine and the cooler unit disposed adjacent the engine. The arrangement includes a support deck provided in the machine body frame for supporting the cooler unit, an attachment unit for releasably fixing the cooler unit to the machine body frame and a movement mechanism provided between the cooler unit and the support deck, the movement mechanism allowing the cooler unit to effect a translational movement to change a distance relative to the engine.

10 Claims, 25 Drawing Sheets

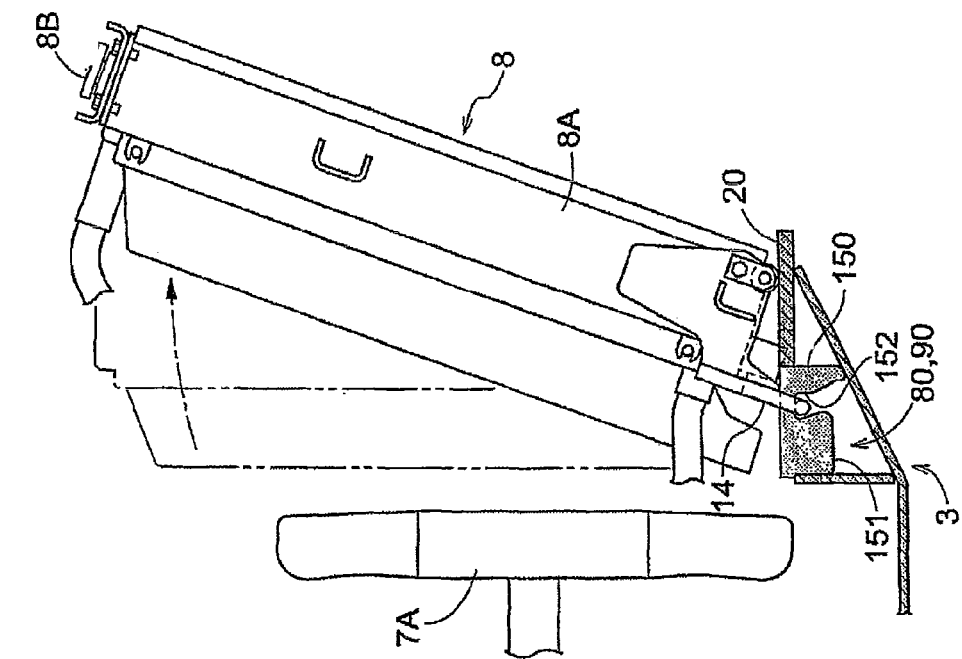
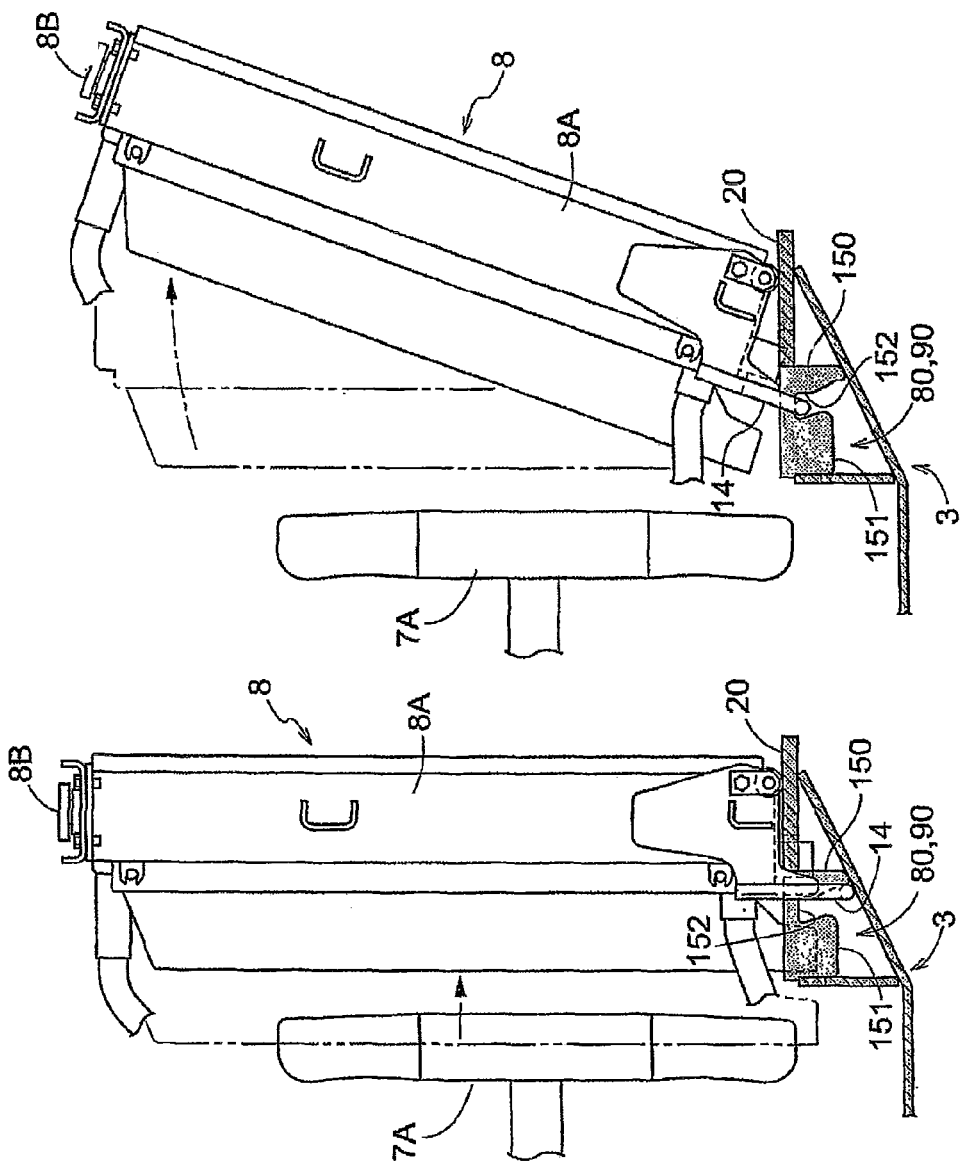
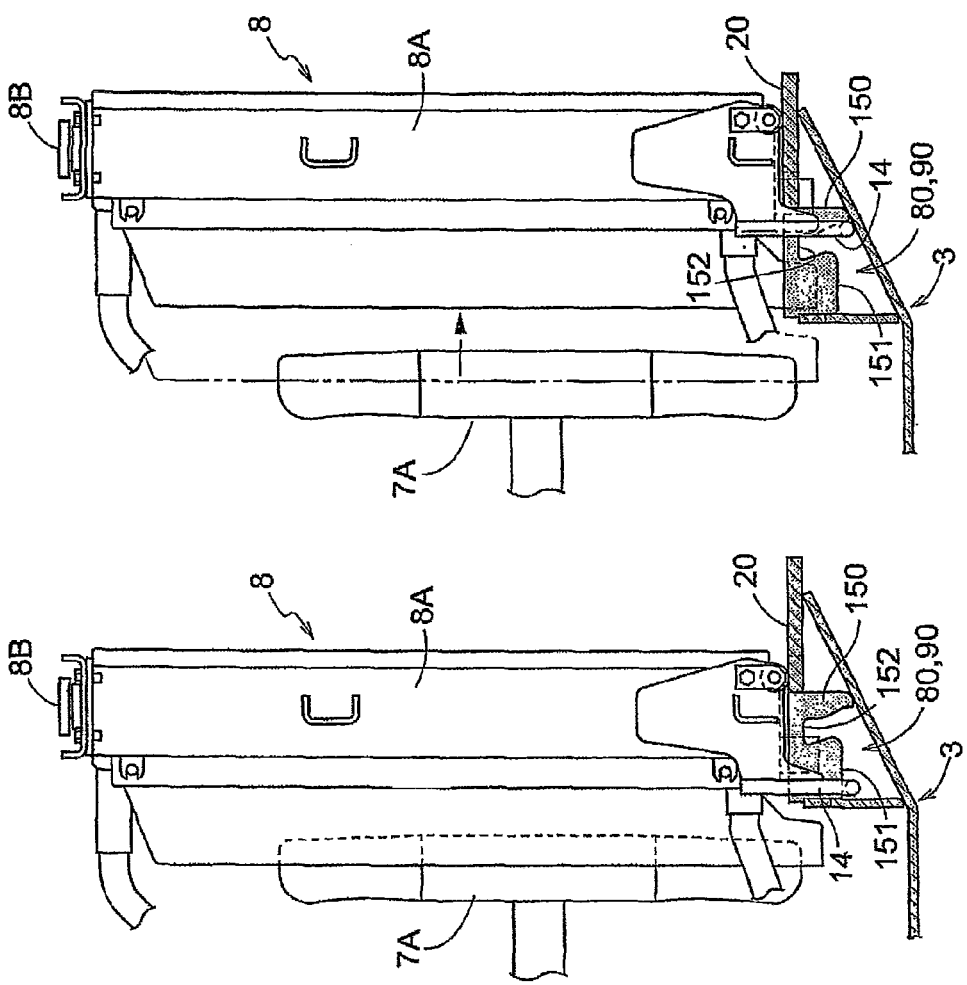

MOUNTING ARRANGEMENT FOR MOUNTING COOLER UNIT TO WORK MACHINE

CROSS REFERENCE TO RELATED APPLICATIONS

This application is a continuation application of U.S. application Ser. No. 12/562,372 filed Sep. 18, 2009, which claims priority to Japanese Patent No. 2009-058481 filed Mar. 11, 2009.

BACKGROUND OF THE INVENTION

1. Field of the Invention

The present invention relates to a mounting arrangement for mounting a cooler unit to a work machine including a traveling device, a machine body frame, an engine and the cooler unit disposed adjacent the engine.

2. Description of the Related Art

With this type of work machine, as disclosed in Japanese Patent Application "Kokai" No. 2002-294748, there is provided a first connecting means connected to an engine of the work machine, the first connecting means pivotally attaching a radiator connected to the engine to the frame so that the radiator may be pivoted about its lower edge, from its closed position where the radiator is located near the frame and its opened position where the radiator is located by a certain distance from the frame.

This first connecting means includes a plurality of support members completely fixed to the frame in respective correspondence with the lower edge of the radiator. Each one of these support members has a saddle-like shape for allowing insertion of the lower edge of the radiator.

The above construction allows easy and speedy cleaning operations of the radiator and the cooling fan in the earth-moving work machine and allows also easy access by a worker's hand to other components of the machine that are attached to the rear portion of the radiator.

With the above-described conventional art, since the radiator is pivoted about its lower portion relative to the frame while the radiator is located at is mounted position, it is difficult to form a space for maintenance between the lower portion of the radiator and the engine.

SUMMARY OF THE INVENTION

In view of the above-described drawback of the conventional art, the principal object of the present invention is to provide a mounting arrangement for mounting a cooler unit to a work machine, which arrangement allows maintenance operation of the cooler unit and/or the engine to be effected smoothly.

For accomplishing the above-noted object, according to the present invention, there is provided a mounting arrangement for mounting a cooler unit to a work machine including a traveling device, a machine body frame, an engine and the cooler unit disposed adjacent the engine, the arrangement comprising:

a support deck provided in the machine body frame for supporting the cooler unit;

an attachment unit for releasably fixing the cooler unit to the machine body frame; and a movement mechanism provided between the cooler unit and the support deck, the movement mechanism allowing the cooler unit to effect a translational movement to change a distance relative to the engine.

Especially, if the general construction of an engine room of the work machine is taken into consideration, it is advantageous to allow the cooler unit to effect a horizontal movement in order to change the distance relative to the engine effectively.

If the cooler unit effects a translational movement, or preferably a horizontal movement by the function of the movement mechanism so as to increase the distance relative to the engine, there is created a space between the cooler unit and the engine, and this space facilitates maintenance operations of the cooler unit and/or the engine, in particular the troublesome maintenance of their mutually opposed sides.

According to one preferred embodiment, the mounting arrangement further comprises a tilt mechanism provided between the cooler unit and the support deck, the tilt mechanism allowing tilting of an upper portion of the cooler unit in the direction away from the engine after the horizontal movement of this cooler unit away from the engine. By the function of the movement mechanism, the cooler unit is moved in the direction away from the engine and then by the function of the tilt mechanism, the upper portion of the cooler unit is tilted about the lower portion thereof, in the direction away from the engine. With these movements, there is created larger upper space with greater opening width between the engine and the cooler unit. Further, if the movement mechanism and the tilt mechanism are combined together as an integral movement/tilt mechanism, then, due to shared use of members, there is achieved advantage of greater simplicity of the construction.

DETAILED DESCRIPTION OF THE PREFERRED EMBODIMENTS

Next, one preferred embodiment of the present invention will be described with reference to FIGS. 1 through 21.

Figure 20:
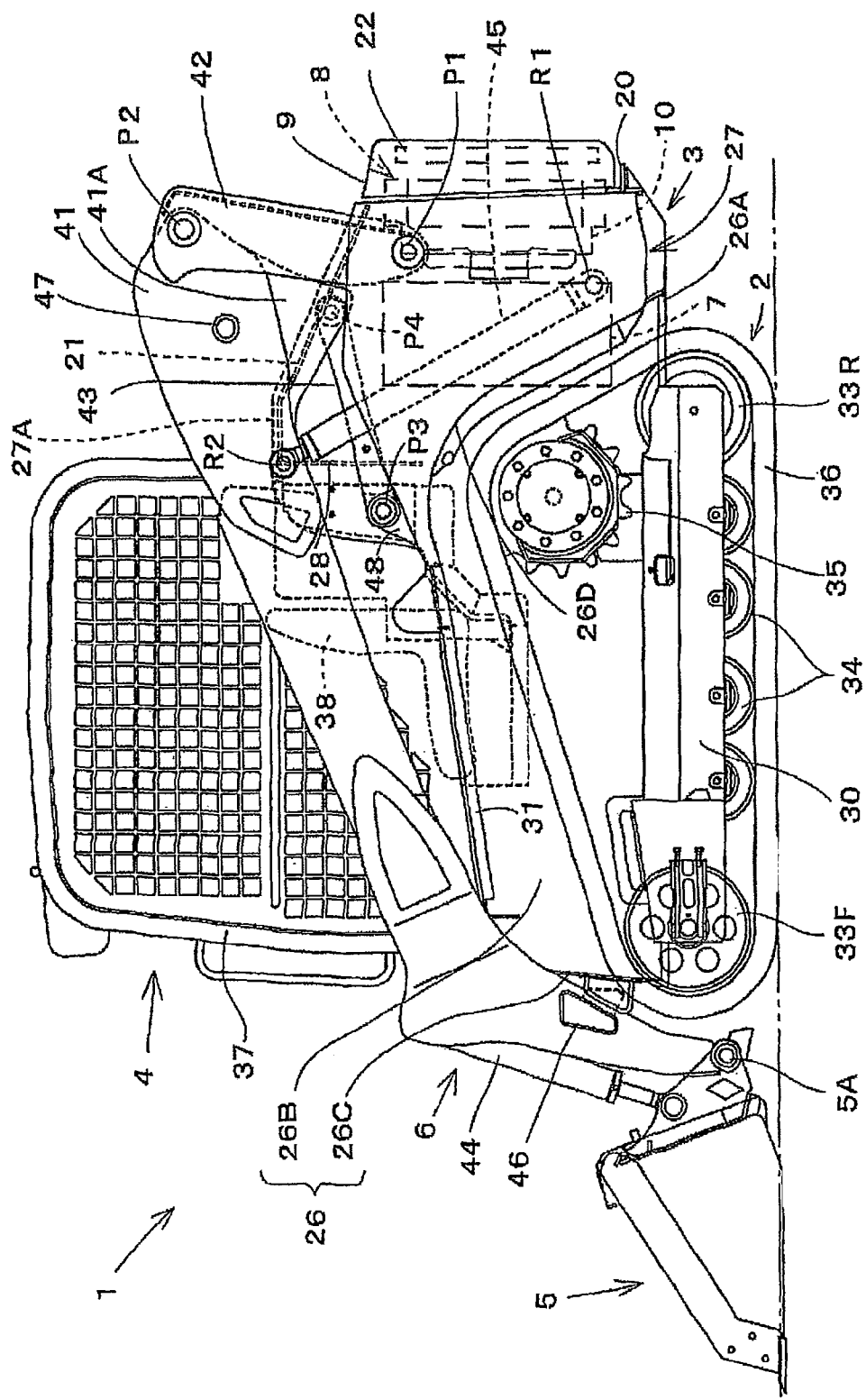
Figure 21:
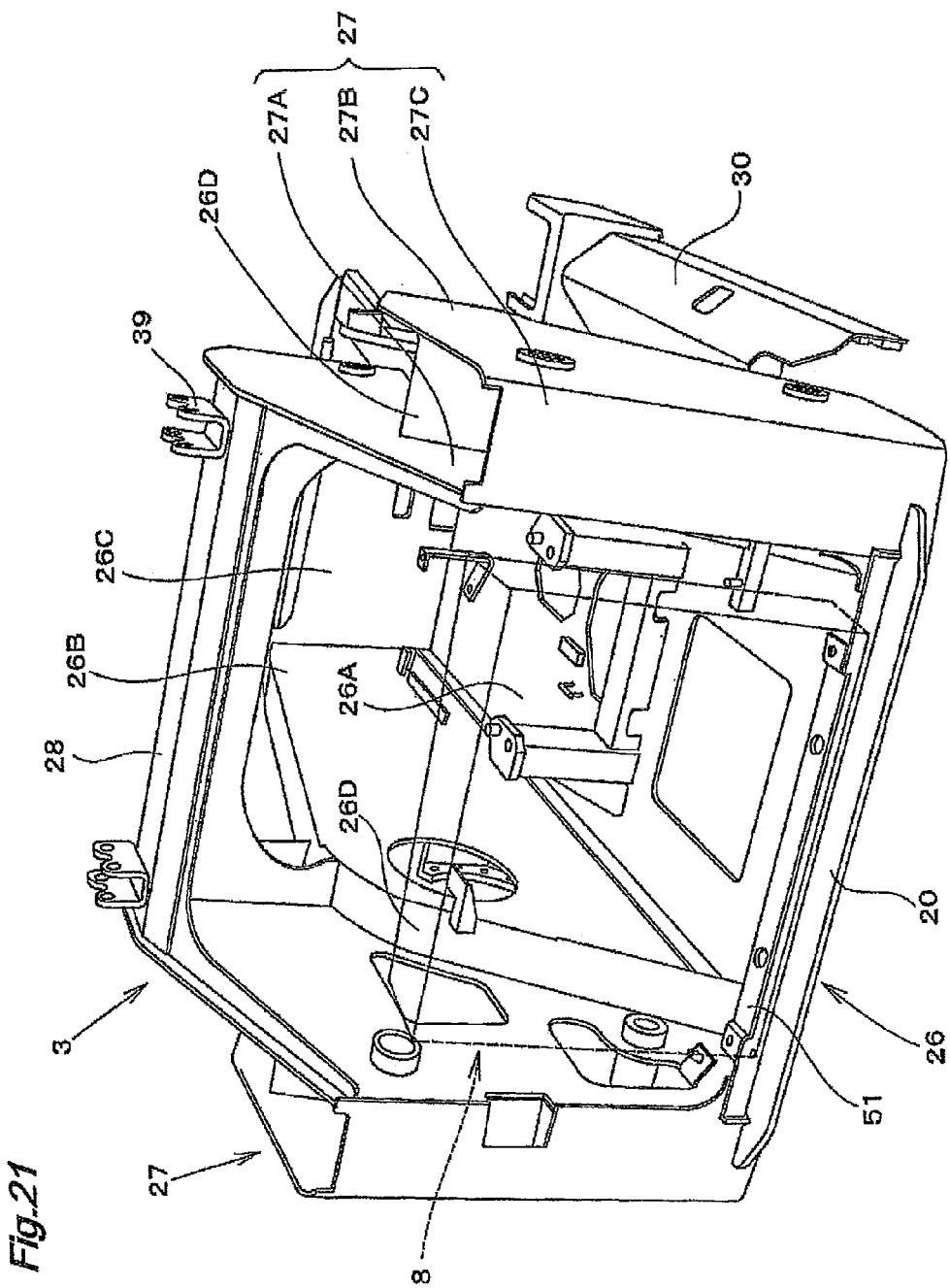
Figure 22:
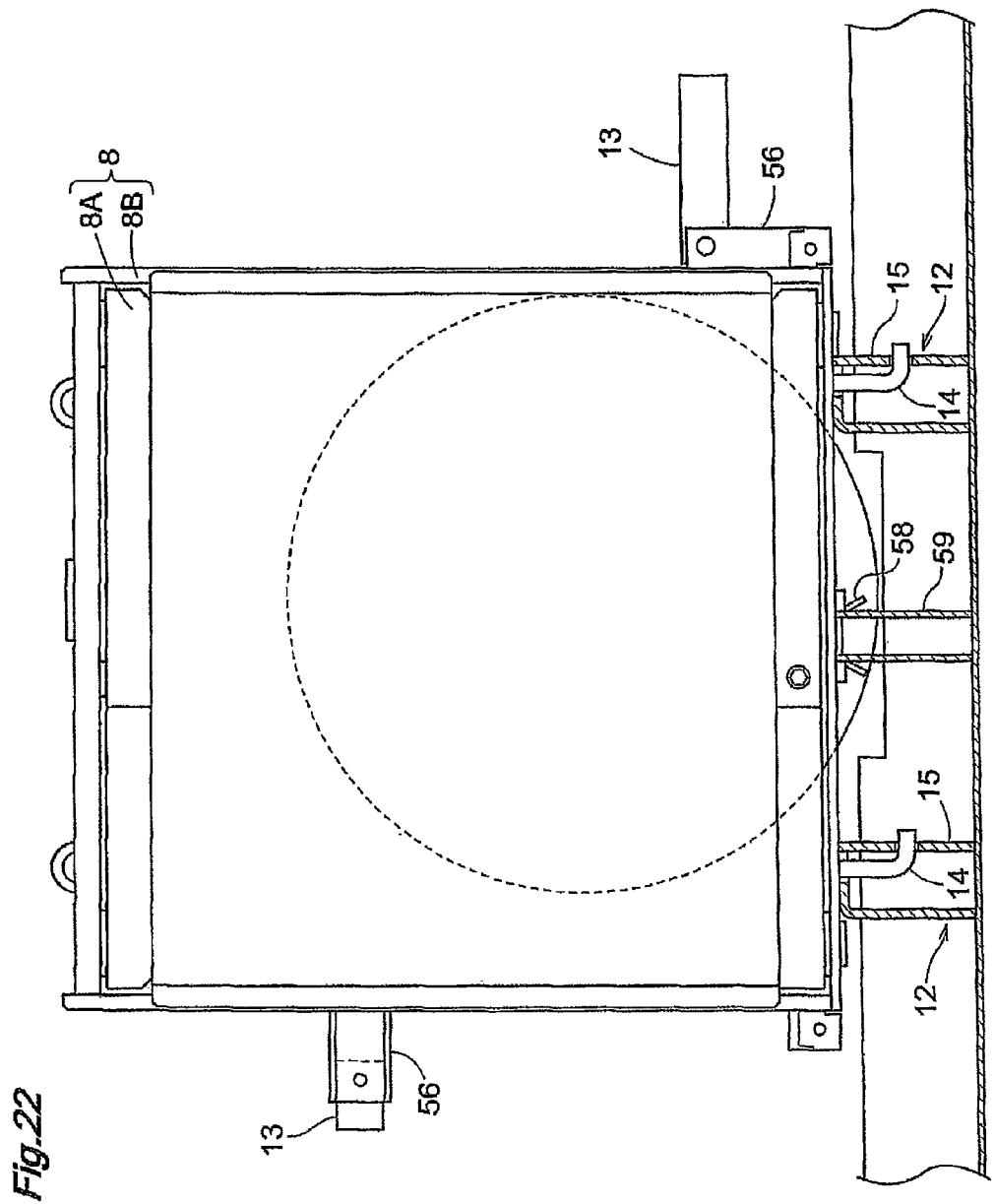
Figure 23:
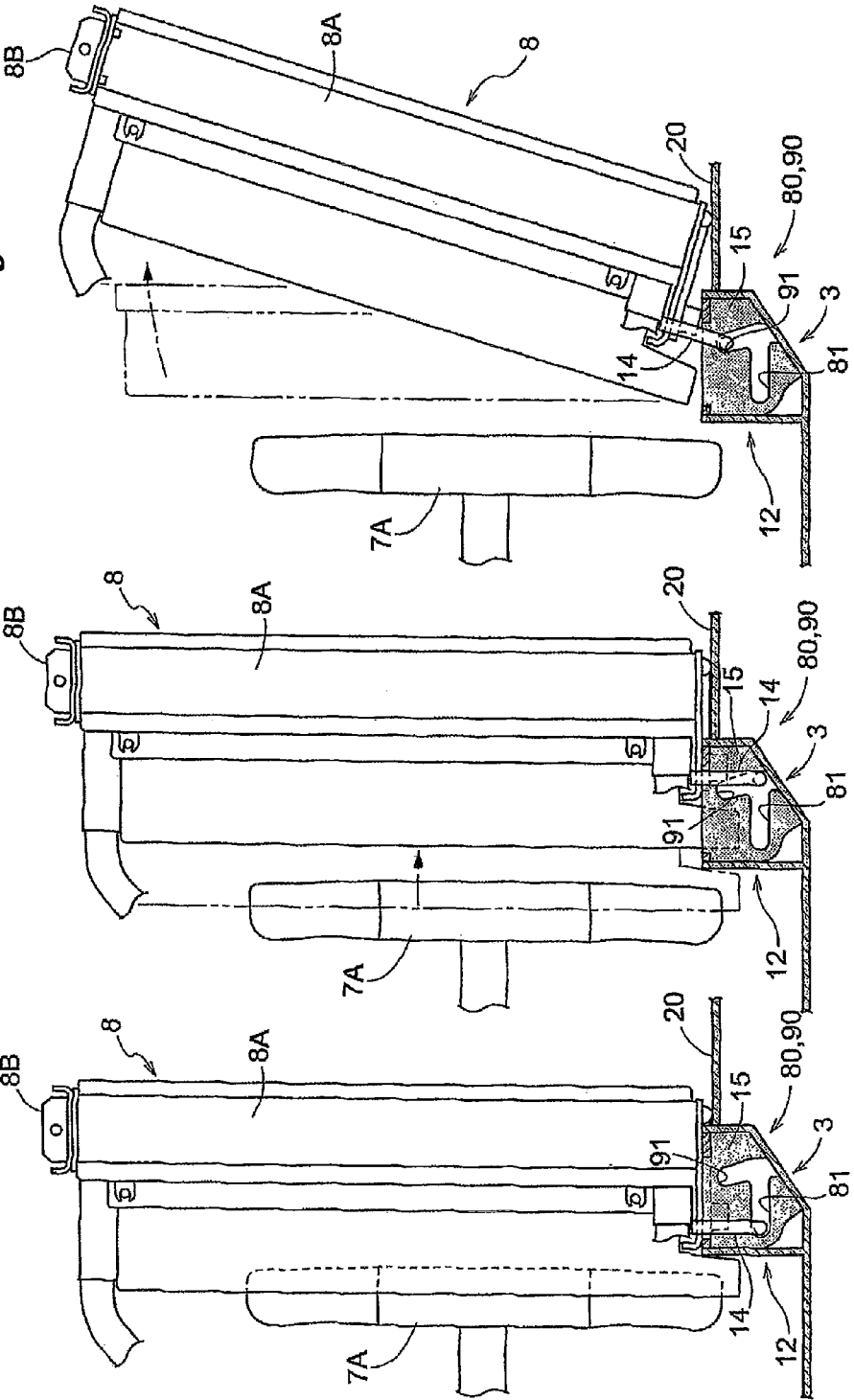

As shown in FIG. 20, according to one preferred embodiment, the present invention is applied to a skid-steer loader 1. In this skid-steer loader, a driving device 4 is mounted at a front portion of a machine body frame 3 suspending a crawler type traveling device 2. The machine body frame 3 supports, on right and left sides at a rear portion thereof, the base side of a work machine (excavating work machine) 6 for lifting up/down an implement (bucket) 5 on the forward side of the driving device 4. At the rear portion of the machine body frame 3, there are mounted an engine 7 and a cooler unit 8. The rear end of the machine body frame 3 is covered with a hood 9 to be opened/closed.

Referring to FIGS. 2, 6, 10, 20 and 21, the machine body frame 3 which is formed of steel plates, forms a box-like frame main body 26 having a bottom wall 26A, right and left side walls 26B, a front wall 26C and a rear wall 26D. To the right and left side walls 26D, there are fixedly attached a pair of right and left support frames 27 which project outward from the respective rear ends of the right and left side walls 26D of this frame main body 26. And, to a rear upper portion of the frame main body 26, there is fixedly attached a bridging member 28 which interconnects the right and left side walls 26D and upper portions of the support frames 27 with each other.

Referring more particularly to the frame main body 26 of this machine body frame 3, a portion thereof forwardly of the bridging member 28 is opened upward and a portion thereof rearwardly of the bridging member 28 is also opened upward, so as to allow mounting of the engine 7 from above. The rear side of the frame main body 26 is opened rearward to allow access to the engine 7 and the cooler unit 8 from the rear side for their maintenance.

Each one of the pair of right and left support frames 27 includes an inner wall 27A, an outer wall 27B and a rear wall 27C which are all formed of metal plates, with front edges of the inner wall 27A and the outer wall 27B being fixedly attached to the rear wall 26D of the frame main body 26 thus forming a box-like arrangement.

The inner wall 27A of the support frame 27 projects more upwardly than the outer wall 27B thereof, and the right/left end portion of the bridging member 28 is fixedly attached to an upper portion of this inner wall 27A. The front wall of the support frame 27 is formed by the rear wall 26D of the frame main body 26, thus acting also as a fender for covering the rear side of the traveling device 2.

The inner walls 27A of the right and left support frames 27 form right and left side walls of an engine room, with upper edges thereof being downwardly inclined rearward from the rear edge of the bridging member 28. A room cover 21 for covering the upper side of the engine room extends with downward inclination from the bridging member 28 to the rear end of the machine body frame 3, so as to provide a greater rear lower view from the driving device 4. The room cover 21 has its front portion pivoted to the bridging member 28, so that the rear portion of the cover can be pivotally elevated to open up the upper side of the engine room.

Each side wall 26B of the frame main body 26 forms an attaching portion 29 for attaching a hydraulic motor of the traveling device 2 and to a lower portion of the outer face of the wall, a track frame 30 is fixedly attached and to an upper edge of the outer face, a fender 31 is fixedly attached. This fender 31 is connected to the upper end of the rear wall 26D of the support frame 27.

The track frame 30 supports front and rear driven wheels 33F, 33R and a plurality of free wheels 34. Around these wheels and a drive wheel 35 attached to the hydraulic motor, a crawler 36 is entrained, thus forming a crawler type traveling device. And, a pair of right and left crawler type traveling devices constitute the traveling device 2.

Incidentally, the traveling device 2 is not limited to the crawler type traveling device, but can be e.g. front/rear wheel traveling device or a traveling device having a front wheel and a rear crawler.

The driving device 4 is disposed upwardly of a front half of the frame main body 26 and includes a driver's seat 38 and a maneuvering device mounted on a floor plate inside a cabin 37. The floor plate of the cabin 37 is provided for a rear half portion of the bottom of the cabin, with a front half portion thereof being opened downward. A driver seated at the driver's seat 38 will place his/her foot on a step provided inside the frame main body 26. The cabin 37 includes an entrance/exit opening in its front side.

The cabin 37 has a pivot shaft at a lower portion in the rear side thereof and this pivot shaft is supported to a support bracket 39 attached to the upper face of the bridging member 28. Further, between the cabin 37 and the frame main body 26, there is provided a damper for cabin lifting.

Thus, the front portion of the cabin 37 can be pivotally elevated about the lower portion of the rear side thereof, from the front-lower side to the rear-upper side, and with this elevation, the inside of the frame main body 26 is opened to allow maintenance of devices, etc. disposed therein.

The work machine 6 includes the implement (bucket) 5, a pair of right and left arms 41 pivotally connecting the implement 5 via a pivot shaft 5A at their leading ends, a lift link 42 pivotally connected to the base portion of each one of the right and left arms 41, a control link 43 pivotally connected to a vicinity of the base portion of the right/left arm 41, an implement cylinder 44 mounted between the implement 5 and the arm 41, and an arm cylinder 45 mounted between the arm 41 and the support frame 27.

The right and left arms 41 are interconnected at front and rear two positions by a front connecting member 46 and a rear connecting member 47, so that the arms are lifted up/down on the right and left sides of the cabin 37. The front connecting member 46 car come into contact with the front wall 26C of the frame main body 26 when the arm 41 is lowered to its lowermost position. The rear connecting member 47 is formed of a pipe and is disposed slightly forwardly of the rear end of the arm 41. Each one of the right and left arms 41 includes, at a lower portion of the opposing side face, a triangular downwardly projecting portion 41A.

The lift link 42 is disposed under a vertical posture, with a lower portion thereof being inserted within the support frame 27 to be pivoted thereto via a first pin P1 and an upper portion thereof being connected via a second pin P2 to a base portion of the arm 41 rearwardly of the rear connecting member 47, with this rear portion being pivotable back and forth.

The control link 43 is disposed under a fore/aft posture, with a front portion thereof pivoted via a third pin P3 to an upper portion of the inner wall 27A of the support frame 27 and a support member 48 fixedly attached to a front upper portion of the rear wall 26D of the frame main body 26 and a rear portion thereof being connected via a fourth pin P4 to the projecting portion 41A adjacent the base portion of the arm

41, with this rear portion being pivotable upward from the approximately horizontal posture.

The arm cylinder 45 has its tube lower portion inserted within the support frame 27 and connected thereto via a first connecting pin R1 and, a cylinder rod leading end thereof is connected to the arm 41 via a second connecting pin R2.

The first pin P1 is located adjacent the rear end upper portion of the machine body frame 3. The third pin P3 is located slightly higher than the first pin P1 and its fore/aft position is overlapped with the rear portion of the cabin 37 of the driving device 4.

The first connecting pin R1 is disposed slightly forwardly of the first pin P1. The second connecting pin R2 is disposed on the opposite side away from the second pin P2 across the rear connecting member 47, with these pins being aligned substantially linearly. The distance from the second pin P2 to the second connecting pin R2 is longer than the distance from the second pin P2 to the fourth pin P4 and also shorter than the distance from the second pin P2 to the third pin P3, so that in a side view, the arm cylinder 47 intersects the control link 43.

Under the lowermost state of the arm 41 where the implement 5 is placed on the ground surface, in the lift link 42, the second pin P2 is slightly rearwardly inclined relative to the first pin P1, and in the control link 43, the fourth pin P4 is slightly rearwardly upwardly inclined relative to the third pin P3, and in the arm 41, the second connecting pin R2 is under a forwardly downwardly inclined posture, as being lower than the second pin P2 and higher than the fourth pin P4. And, the arm cylinder 45 intersects the control unit 43 at the approximate center in the fore/aft direction of the latter, and the arm cylinder 45 extends substantially perpendicularly to the centerline interconnecting the second pin P2 of the arm 41 and the pivot shaft 5A.

The arm 41, the lift link 42 and the control ink 43 constitute a four-link structure having the first pin P1 through the fourth pin P4 as the four links thereof. In operation, when the arm cylinder 45 is expanded, the structure elevates the arm 41 about the second pin P2, with restriction by the control link 43 and with a fore/aft pivotal movement of the lift link 42.

Over the entire range of the elevating movement of the arm 41 from its lowermost position to the uppermost position, the lift link 42 does not project more rearward than the hood 9, whereas the control ink 43 changes in its posture from its rear-raised position to the rear-inclined posture, but this vertical movement is only with a range smaller than 90 degrees.

In the first embodiment shown in FIGS. 1-13, 20 and 21, in the machine body frame 3, to the rear end of the bottom wall 26a of the frame main body 26, there is fixed an extension bottom plate 51 forming the bottom between the right and left support frames 27, and the engine 7 is mounted on the bottom wall 26A and this extension bottom plate 51. Further, at a rear portion of the extension bottom wall 51, there are provided support decks 12 and a carrier deck 20, and the cooler unit 8 is mounted via the support decks 12.

The engine 7 includes, on the side of its rear face, a cooling fan 7A which is driven by the crank shaft via a belt transmission means 7B. And, the cooler unit 8 is disposed rearwardly of this engine 7. To the face of this cooler unit 8 on the side of the engine 7, there is attached a fan shroud 10 covering the cooling fan 7. Incidentally, in this embodiment, the center of the cooler unit 8 is offset from the center of the cooling fan 7A. However, these centers can be in agreement with each other.

The cooler unit 8 includes a cooler unit body 8A, and a cooler unit frame 8B surrounding the right and left sides and upper and lower sides of the cooler unit body 8A for its protection.

The cooler unit body 8A is an arrangement integrating together a radiator and an oil cooler disposed in juxtaposition. The radiator has an inlet cap 8a for allowing introduction of water and a hose 8b connected between the engine 7 and this radiator. To the oil cooler, a hydraulic hose 8c is connected.

Figure 1:
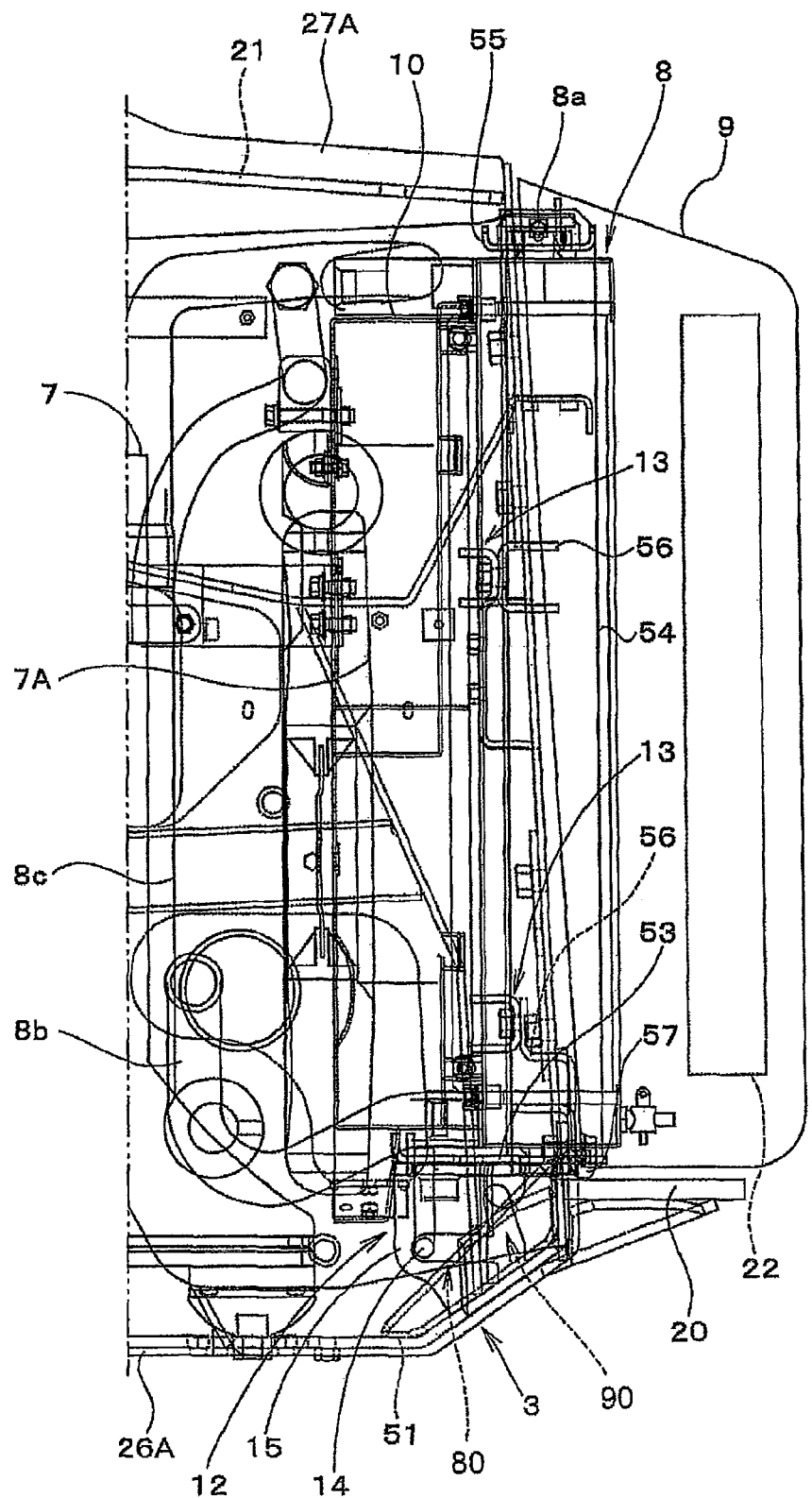
FIG. 1 a side view in vertical section of principal portions showing a first embodiment of the present invention, FIG. 2 an overall side view in section, FIG. 3 a side view of principal portions, FIG. 4 a side view of a guide vertical plate, FIG. 5 an exploded side view of a cooler unit frame, FIG. 6 a rear view of principal portions, FIG. 7 a rear view of the cooler unit, FIG. 8 an exploded side view of a cooler unit frame, FIG. 9 a plane view of principal portions, FIG. 10 an overall plane view, FIG. 11 a plane view of principal portions, FIG. 12 a plane view of an upper plate of the cooler unit frame, FIG. 13 a plane view of a lower plate of the cooler unit frame, FIG. 14 a side view in section of principal portions showing a second embodiment of the present invention, FIG. 15 an enlarged side view of a lower section of the cooler unit, FIG. 16 a rear view of principal portions, FIG. 17 a rear view of a cooler unit, FIG. 18 a plane view of principal portions, FIG. 19 an enlarged plane view of principal portions, FIG. 20 an overall side view of a work machine, FIG. 21 a perspective view showing a machine body frame as seen from its rear side, FIG. 22 a rear view of the cooler unit, showing only its principal portions, FIGS. 23A, B, C: diagrams illustrating a horizontal movement of the cooler unit in the first embodiment, FIG. 24 a side view showing only the principal portions of the cooler unit in the third embodiment, FIG. 25 a rear view showing only the principal portions of the cooler unit in the third embodiment, and FIGS. 26A, B, C diagrams illustrating a horizontal movement of the cooler unit in the third embodiment.
Figure 2:
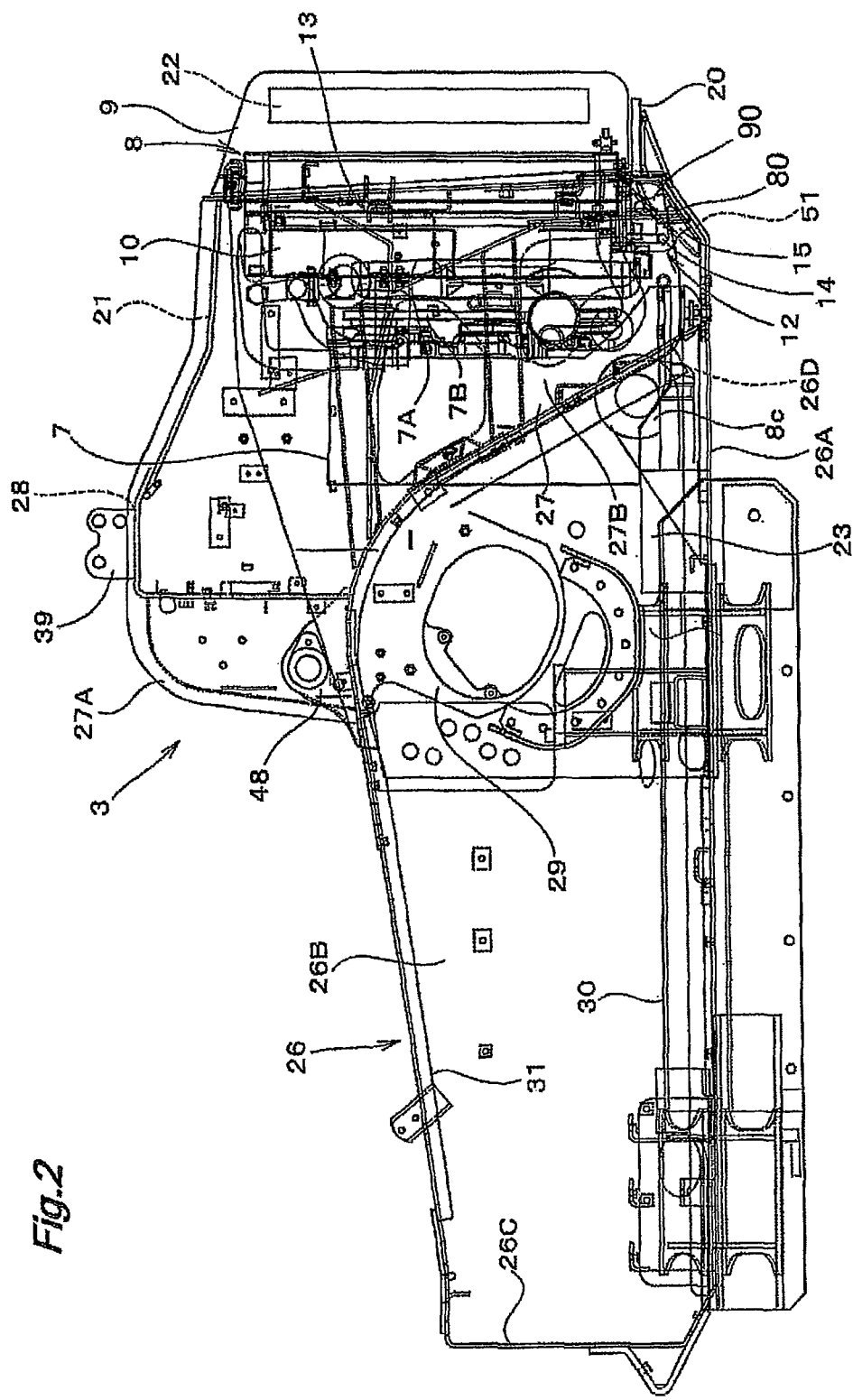
Figure 3:
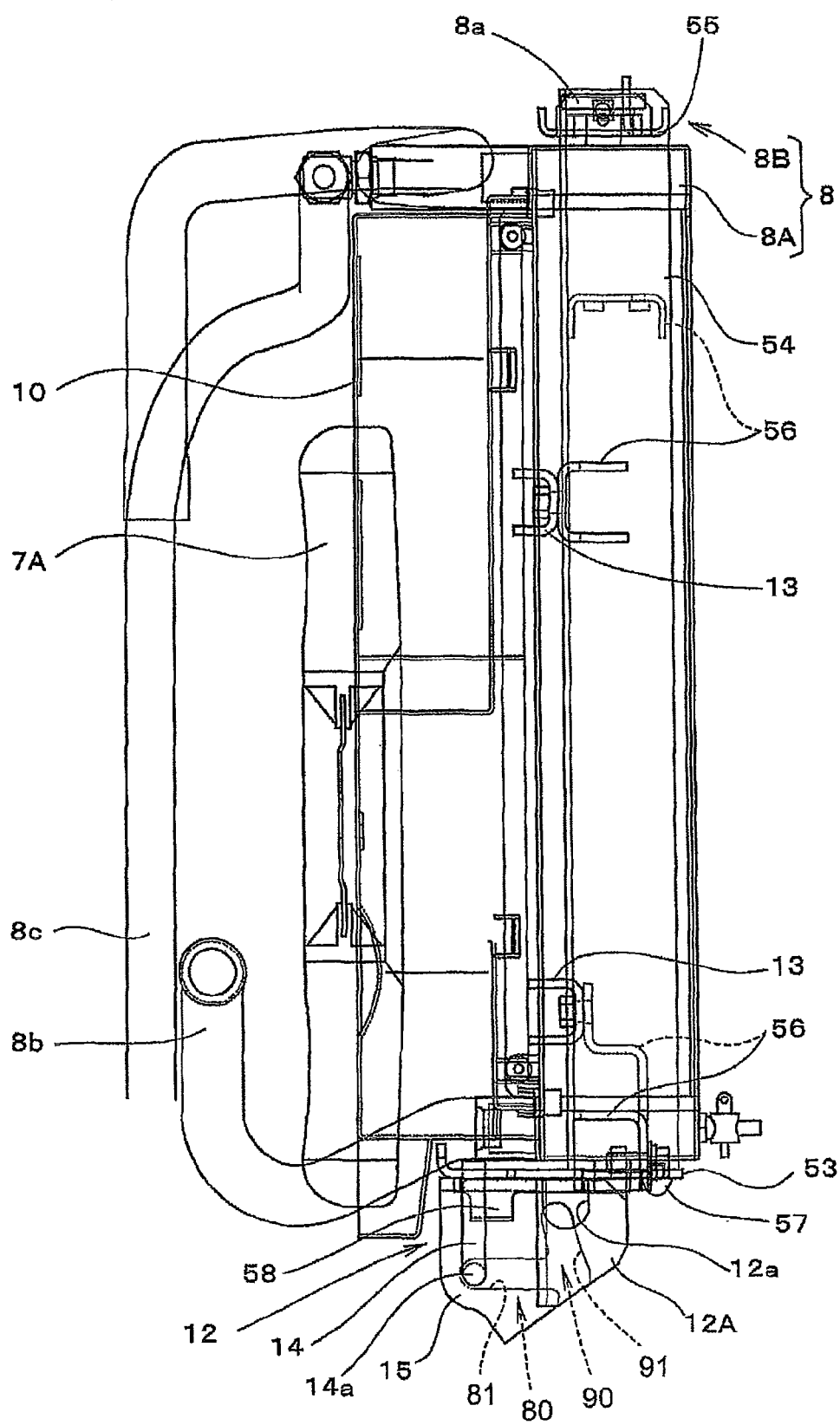
Figure 4:
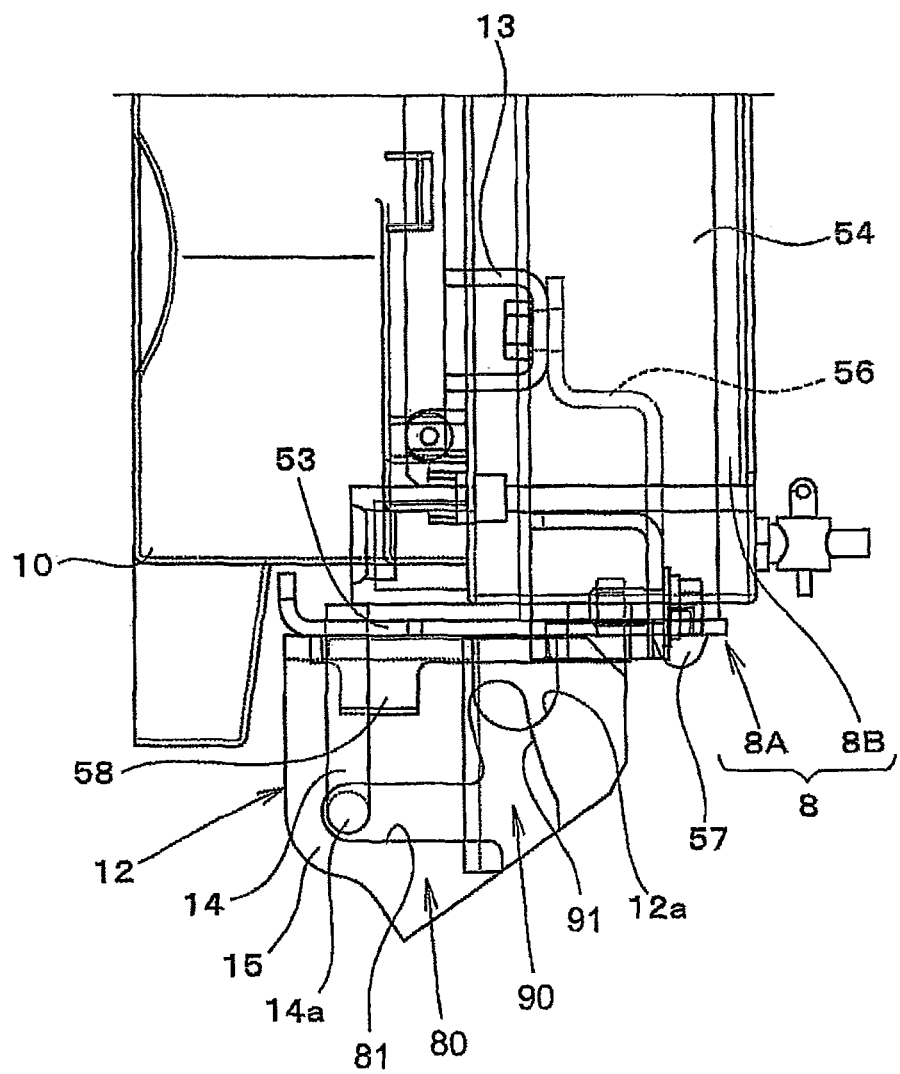
Figure 5:
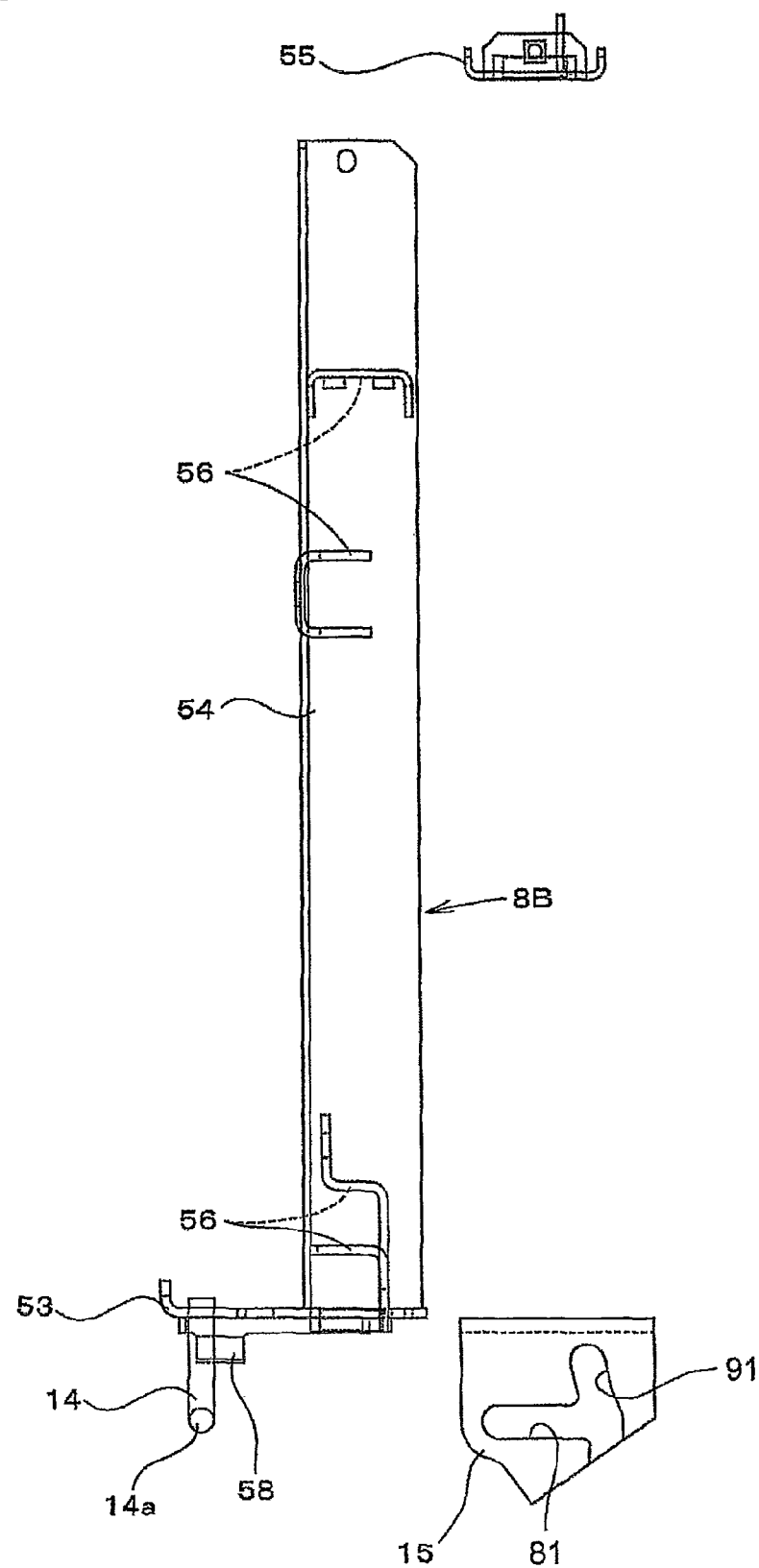
Figure 6:
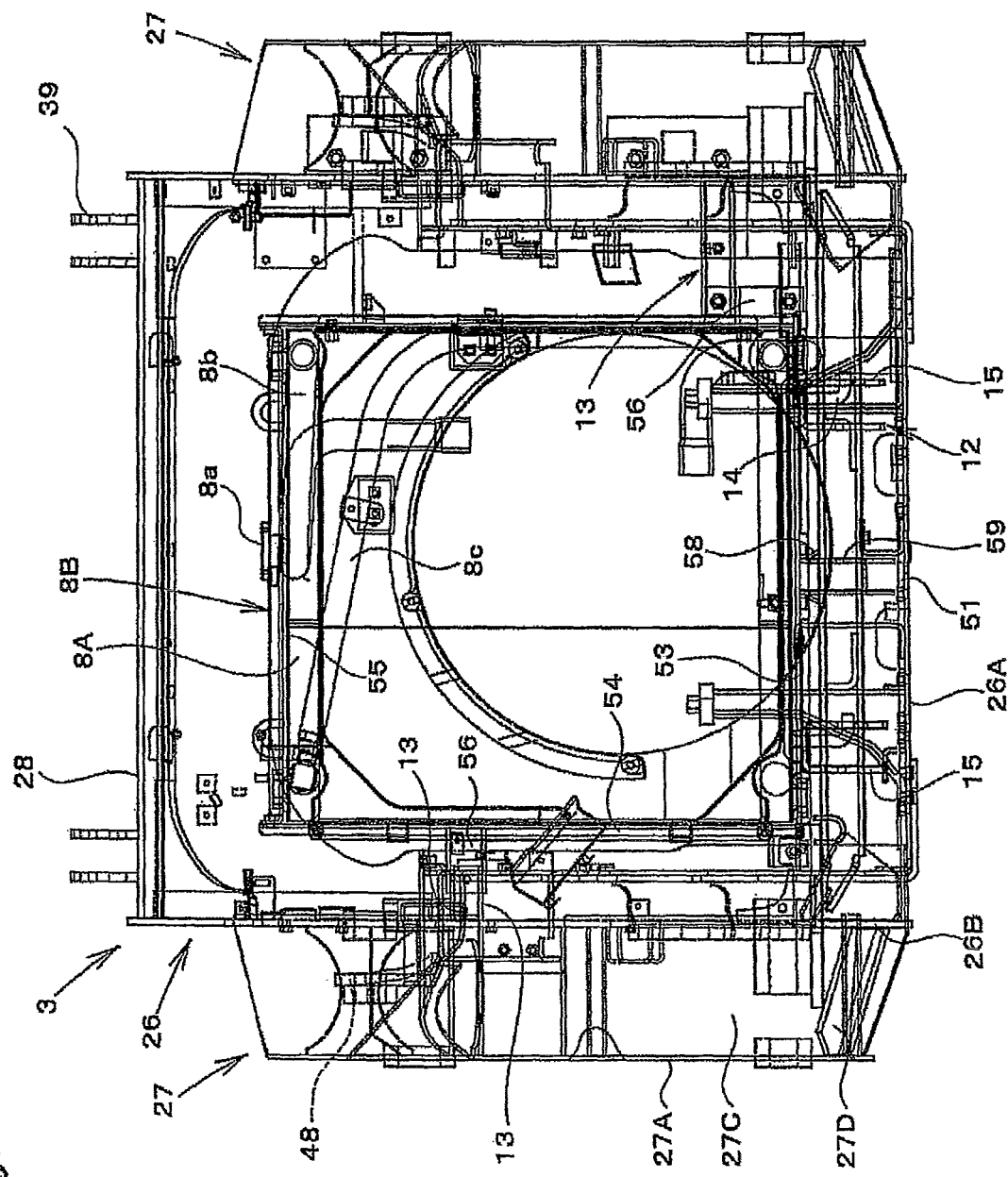
Figure 7:
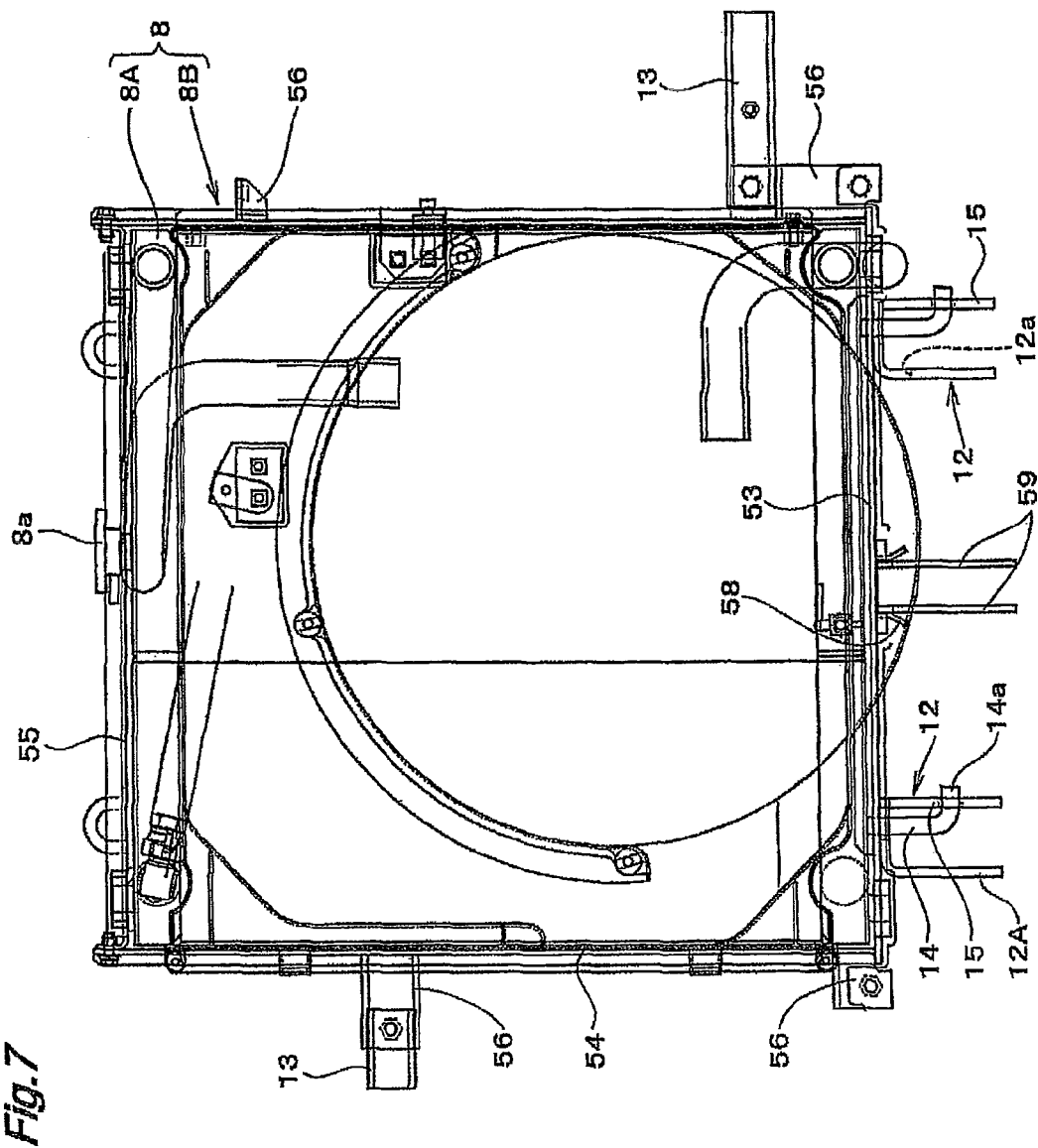
Figure 8:
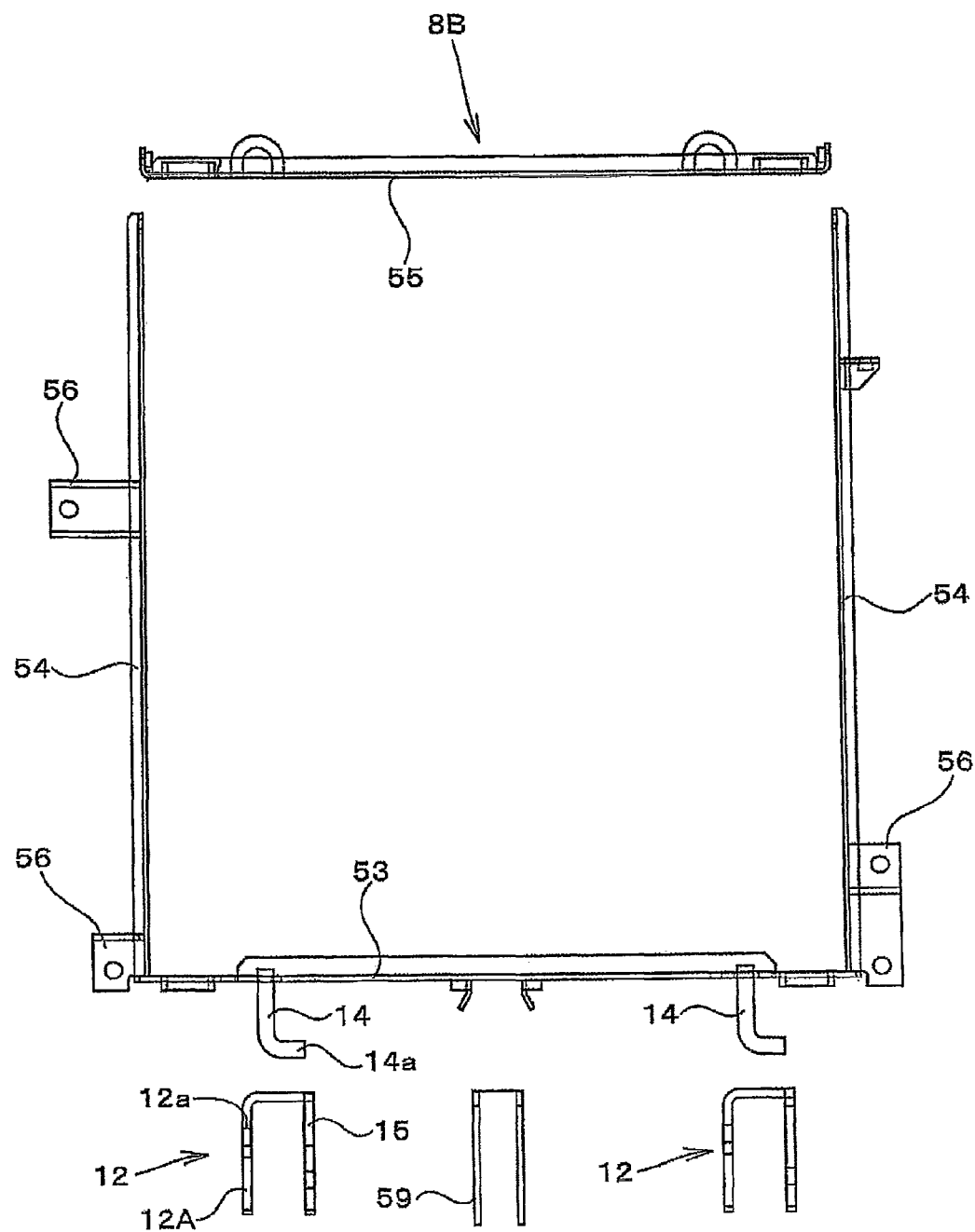
Figure 9:
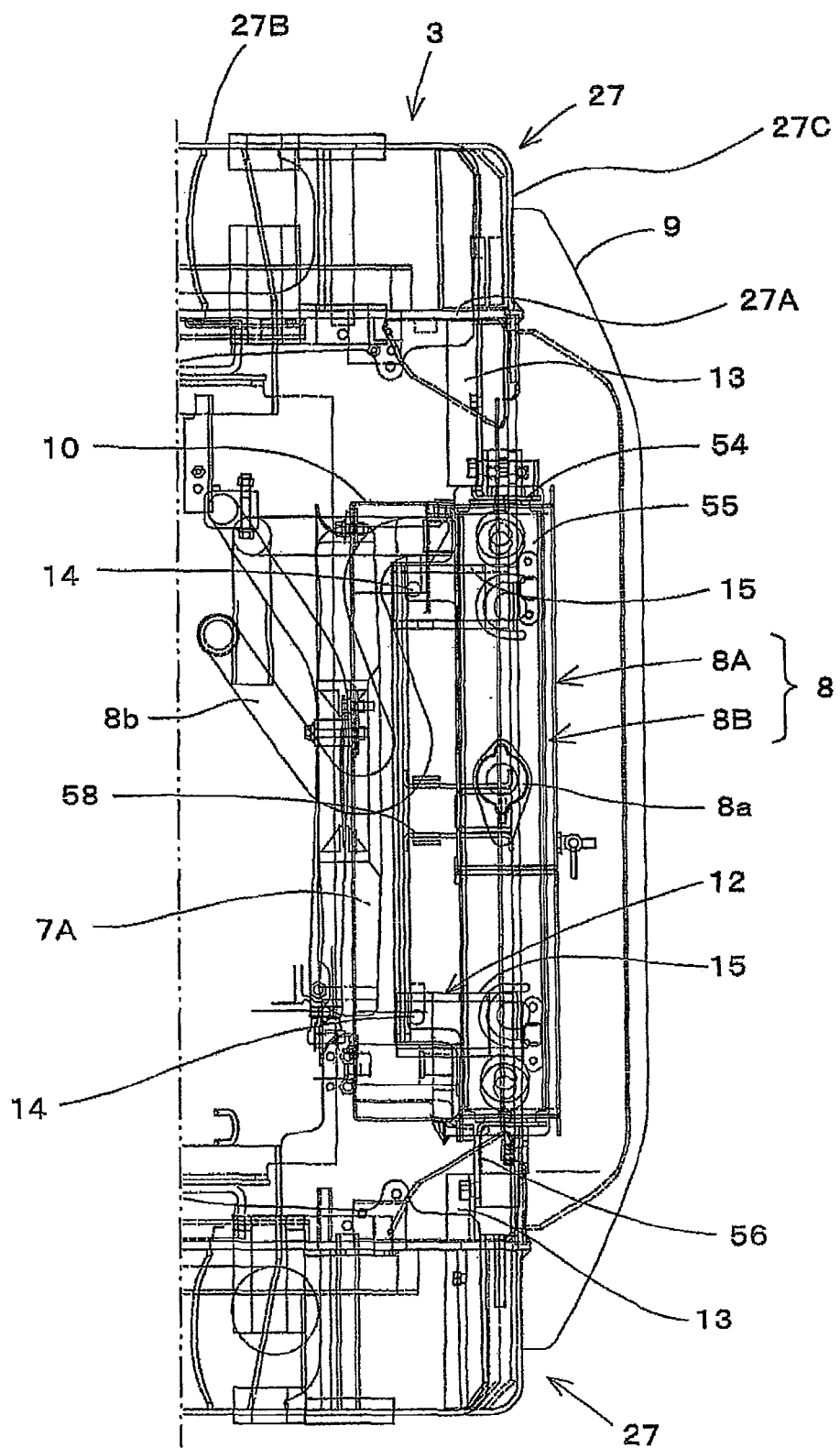
Figure 10:
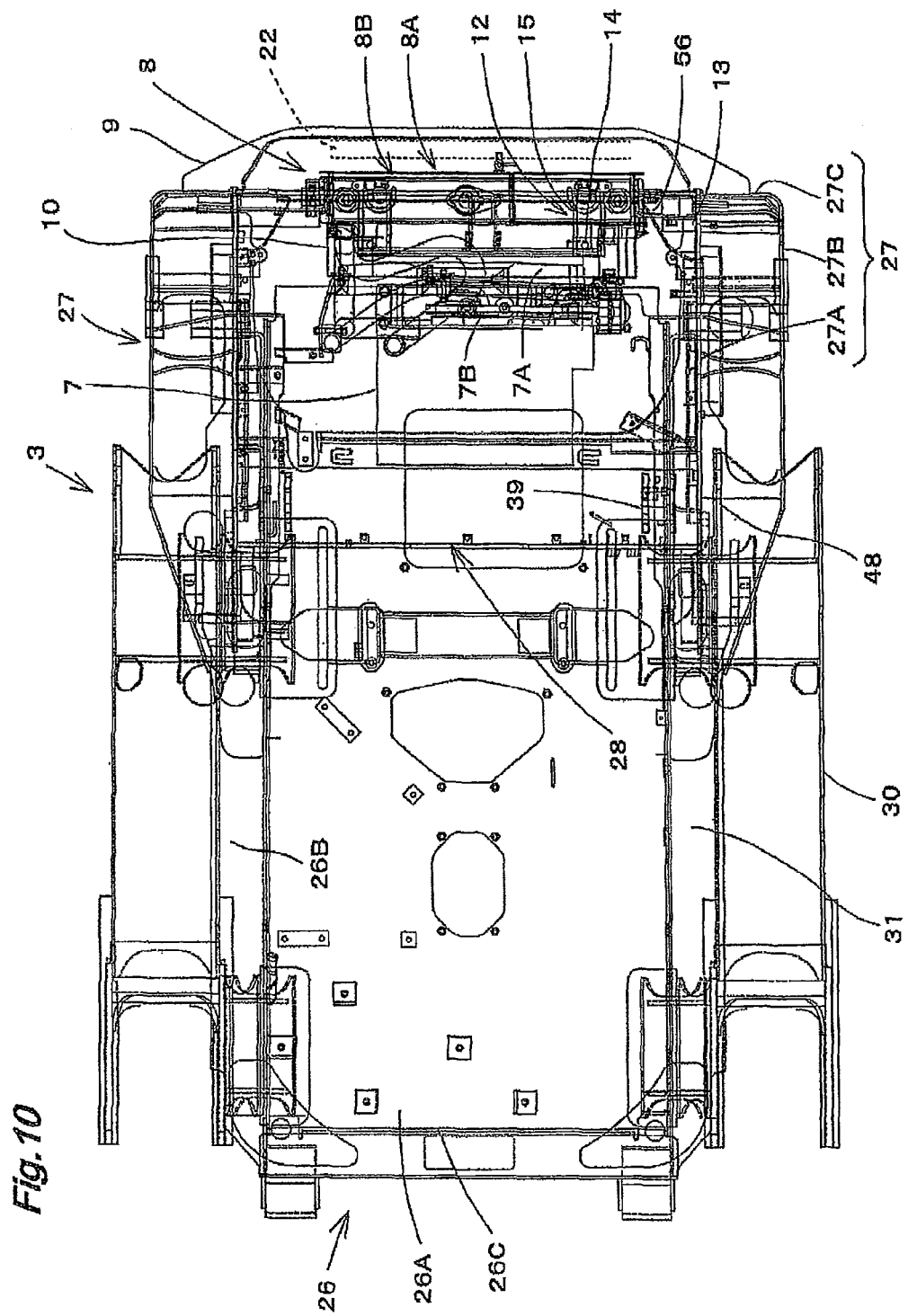
Figure 11:
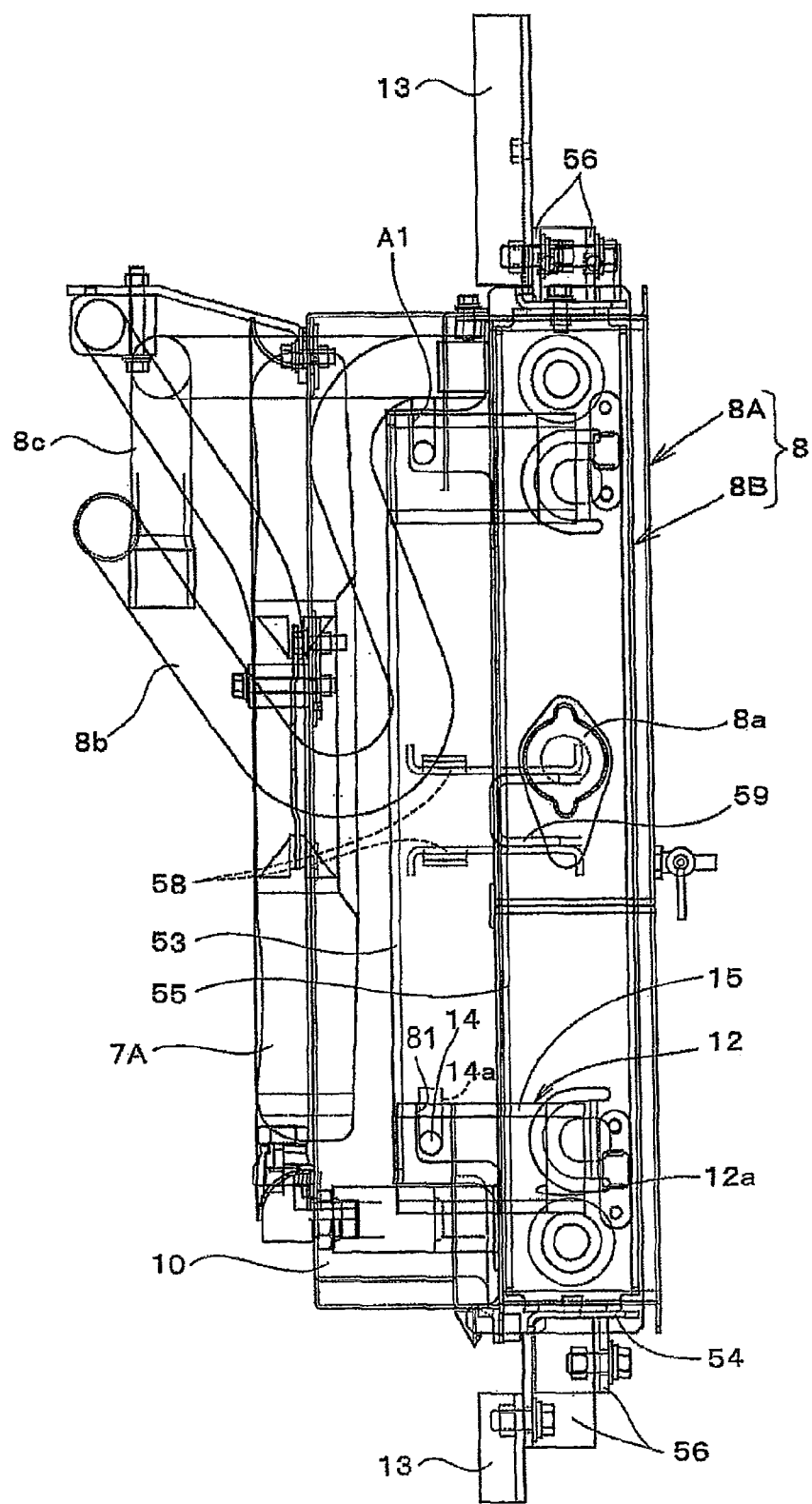
Figure 12:
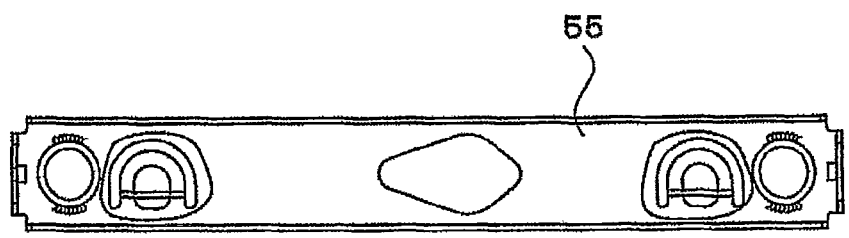
Figure 13:
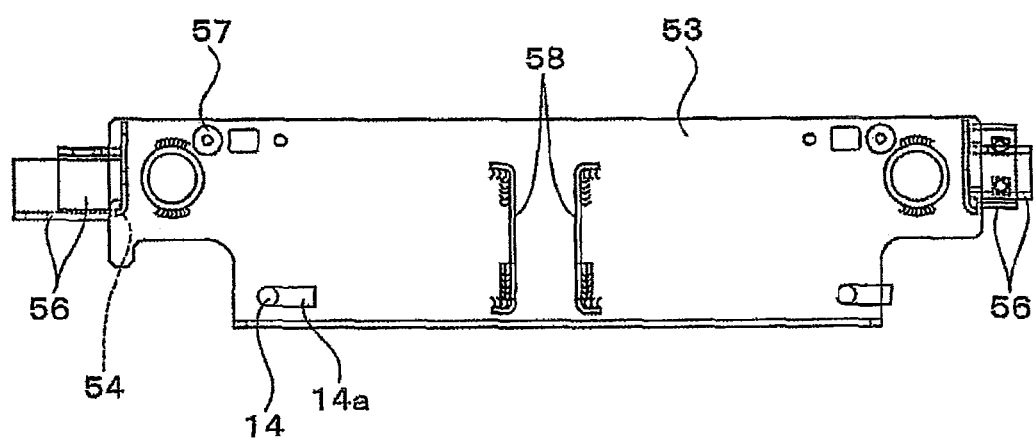

The hydraulic hose 8c of the oil cooler is connected to a hydraulic relay device 23, together with hydraulic hoses of other hydraulic devices. And, via this hydraulic relay device 23, the hose 8c is connected to a hydraulic tank. The hydraulic hose 8c, as shown in FIG. 2, is disposed in a coiled state between the oil cooler and the hydraulic relay device 23, so that when the cooler unit 8 is moved back and forth, the radius of the coil changes accordingly, so that the hose can be extended/contracted or flexed smoothly and compactly.

Referring to the cooler unit 8, the rear portion thereof projects more rearwardly than the rear end of the room cover 21 covering the rear face of the machine body frame 3 and the upper side of the cooler unit 8, and this projecting exposed portion is covered with the hood 9 for opening/closing the rear end of the machine body frame 3.

The rear face of the machine body frame 3 is not perpendicular, but is forwardly inclined, with the upper portion being on the forward side, and the upper portion of the cooler unit 8 is exposed more greatly from the rear face of the machine body frame 3 than the lower portion of the unit.

The hood 9 is supported to one right/left side of the rear face of the machine body frame 3 to be pivotable about a vertical axis. On the inner face of the hood 9 facing the cooler unit 8, there is attached an auxiliary cooler unit 22 such as an air conditioner. This auxiliary cooler unit 22 is connected to the devices inside the machine body frame 3 via a medium conveying hose.

The cooler unit 8A can consist of a radiator alone, and the oil cooler can be attached as the auxiliary cooler unit 22 to the hood 9.

The cooler unit frame 8B includes a lower plate 53, a pair of right and left side plates 54 having lower ends thereof fixedly attached to the rear upper face of this lower plate 53, and an upper plate 55 fastened by bolts to the upper portions of the right and left side plates 54, with the right and left side plates 54 or the upper and lower plates 53, 55 binding the cooler unit body 8A therebetween. The inlet cap 8a of the cooler unit body 8A projects upward through the upper plate 55.

On the lower face of the lower plate 58, there is provided a positioning member 58 formed by welding two plate members to the right/left approximate center portion of the lower face. On the right and left opposed sides of the front side portion, a pair of right and left engaging members 14 having an L-shape in the rear view are fixed to project downward therefrom. The lower portion of the right and left engaging members 14 have a same bending direction.

Further, at the right and left opposed sides of the front side portion of the lower face of the lower plate 53, there are provided support members 57 formed of elastic rubber or resin. And, these support members 57 can come into contact with the carrier deck 20. Alternatively, the support members 57 can be freely rotatable wheels.

The fan shroud 10 is attached to either the cooler unit body 8A or the cooler unit frame 8B and its attaching portion has a similar shape to the cooler unit frame 8B and its portion facing the cooling fan 7A is formed circular and there is provided a seal member 64 having a circular shape in the rear view. This seal member 64 is expandable/contractible along the axis of the cooling fan 7A.

The engine 7 includes a seal receiving member (not shown) engageable with the cooling fan 7A with a clearance relative thereto and the seal member 64 is placed in detachable contact with this seal receiving member. The cooling fan 7A is a blowout type. The seal member 64 serves to prevent reduction in the wind velocity due to increase of the clearance (chip clearance) between the cooling fan 7A and the fan shroud 10. Hence, when the member 62 is attached again after movement of the cooler unit 8, the chip clearance can be minimal, thus preventing inadvertent contact between the fan shroud 10 and the cooling fan 7A.

On the outer face of each one of the right and left side plates 54, upper and lower stays 56 are fixedly attached. These stays 56 are detachably attached via bolts to an attaching member 13 provided in e.g. the right left support frames 27 of the machine body frame 3, the extension bottom plate 51, etc. The attaching member 13 is one counterpart member of an attachment unit.

The pair of right and left support decks 12 provided at the rear portion of the extension bottom plate 51 comprise a portal structure formed by connecting upper ends of guide vertical plates 15 to the horizontal upper portion of a member 12A having an inverse-L-shaped figure in its rear view, and the upper faces of the decks 12 are substantially horizontal to mount the lower plate 53 of the cooler unit 8 with allowing horizontal movement (sliding) thereof.

The support decks 12 are provided as the right and left pair and each guide vertical plate 15 is disposed on the same side (right side) thereof, in correspondence with the bending direction of the horizontal lower portions 14a of the right and left engaging members 14.

The guide vertical plate 15 defines a movement slot 81 in which the horizontal lower portion 14a of the engaging member 14 is engageable to be guided back and forth in the horizontal direction and a tilt slot 91 communicated with the movement side end of the rear portion of this movement slot 81, the tilt slot 91 being configured for guiding upward movement of the horizontal lower portion 14a of the engaging member 14 so as to allow a tilting movement of the upper portion of the cooler unit 8 to the rear wide away from the engine 7.

The engaging member 14 provided between the cooler unit 8 and the support deck 12 and the movement slot 81 together constitute a movement mechanism 80 for allowing rearward horizontal movement of the cooler unit 8 and also of the fan shroud 10 attached to this cooler unit 8, from the engine 7 side. The engaging member 14 and the tilt slot 91 together constitute a tilt mechanism 90 for allowing rearward tilting movement of the upper portion of the cooler unit 8 about the lower portion thereof to the rear side away from the engine 7, after release of fixation by the attaching member 13 and subsequent rearward horizontal movement of the cooler unit 8.

At an upper portion of the inverse L-shaped member 12A of the support deck 12, there is formed a cutout 12a. By inserting the horizontal lower portion 14a of the engaging member 14 into this cutout 12a from above and the moving in the right/left direction, the horizontal lower portion 14a can be engaged within the movement slot 81 or the tilt slot 91.

To a rear portion of the extension bottom plate 51, there is fixedly attached a set member 59 provided at substantial center between the right and left support decks 12 and acting also as a receiver for receiving the cooler unit 8. This set member 59 is an integral portal-shaped member or an assembly of two separate vertical plates disposed vertically and side by side. In operation, this set member 59 comes into contact with the cooler unit frame 8B between right and left positioning members 58, thus fixedly positioning the cooler unit 8 in the right/left direction.

For mounting the cooler unit 8 on the support decks 12, the cooler unit 8 will be lowered from above to insert the horizontal lower portions 14a of the engaging portions 14 into the cutouts 2a in opposition to the tilt slots 91 (or the movement slots 81). Then, under this condition, the cooler unit frame 8B will be placed on the support decks 12, with engaging the right and left positioning members 58 with the right and left set members 59.

When the cooler unit frame 8B is mounted on the support decks 12, the cooler unit 8 is set at a proper position in the right/left direction, and the horizontal lower portions 14a of the engaging members 14 are located at the intersections between the movement slots 81 and the tilt slots 91, so that the unit is movable both forwardly and upwardly.

When the horizontal lower portion 14a of the engaging member 14 is located at the intersection between the movement slot 81 and the tilt slot 91, the support member 57 is mounted on a rear portion of the carrier deck 20 and the fan shroud 10 can move upward with rearward displacement from its condition surrounding the cooling fan 7A. As a result, there can be created a space in the fore/aft direction between the engine 7 and the cooling fan 7A and the cooler unit 8 and the fan shroud 10.

Under the above-described condition, if the cooler unit 8 is forwardly moved horizontally (sliding movement), the support member 57 moves forwardly on the carrier deck 20 and the horizontal lower portion 14a of the engaging member 14 moves forwardly within the movement slot 81. With this forward horizontal movement, the right and left and upper and lower stays 56 as the other counterpart members of the attachment unit comes into opposition to the attaching members 13 as the one counterpart members of the attachment unit, and then by bolt-fastening these together, the cooler unit 8 is fixed to the machine body frame 3.

On the other hand, by loosening the bolts fastening the stays 56, the fixation by the attaching member 13 will be released, so that the cooler unit 8 is rendered movable horizontally relative to the machine body frame 3 and if the horizontal lower portion 14a of the engaging member 14 is moved horizontally rearward within the movement slot 81 to the intersection with the tilt slot 91 which is the rear end of the movement slot 81, the cooler unit 8, will now be moved, over its entire vertical area including both the upper and lower portions thereof, away from the engine 7, thus creating a space usable for maintenance and also enabling movement thereof into the tilt slot 91.

Then, when the upper portion of the cooler unit 8 is rendered tiltable about the support member 57 to the rear side away from the engine 7, the horizontal lower portion 14a of the engaging member 14 will move upward within the tilt slot 91 (sliding movement) and then come to a stop at the upper end of this tilt slot 91. With this stopping of the horizontal lower portion 14a at the upper end of the tilt slot 91 and stopping of the upward movement thereby, the cooler unit 8 is retained under the rearwardly tilted posture.

With this rearward tilting movement of the cooler unit 8, the space in the fore/aft direction created previously between the engine 7, the cooling fan 7A and the cooler unit 8 and the fan shroud 10 by the rearward horizontal movement is enlarged and widened from an I-shape to a V-shape.

Further, as the upper portion of the rear face of the machine body frame 3 is formed as a forwardly inclined face with the upper portion being on the forward side, the above-described V-shaped space formed with the rearwardly tilted cooler unit 8 is widened and opened up even further at the upper portion of the rear face of the machine body frame 3, thus improving visibility of the cooling fan 7A, the belt transmission means 7B and devices around them, from the upper side, thus providing a space allowing access thereto by a hand introduced therethrough.

Second Embodiment

FIGS. 14 through 19 show a second embodiment of the present invention. In this second embodiment, the movement mechanism 80 and the tilt mechanism 90 for the cooler unit 8 are formed in a horizontal plate.

A cooler unit frame 8B includes a lower plate 53, a pair of right and left side plates 64, and an upper plate 55. In the lower face of the lower plate 53, there is provided a hook member 17 as a downward projection, the hook member being formed by inserting and fixing a pin through right and left sides of a front portion. And, at a lower end of this hook member 17, there is engaged and fixedly attached, under an inclined posture, a stopper member 18 having an approximate front-round, rear-rectangular shape.

Each one of the pair of right and left support decks 12 fixed to the extension bottom plate 51 is formed by bending a band plate into a portal shape and its upper face forms a horizontal portion capable of mounting thereon the cooler unit 8, and this horizontal portion constitutes a guide horizontal plate 19 constituting the movement mechanism 80 and the tilt mechanism 90.

This guide horizontal plate 19 defines a slot having an approximately L-shape in the plane view and receiving an engaging member 17 therethrough. In this plane-viewed L-shaped slot 82, its fore/aft extending portion constitutes a movement slot 82, whereas its portion extending from its rear end to intersect the horizontal movement direction (right/left direction) constitutes a transverse movement slot 83.

The movement slot 82 guides fore/aft horizontal movement of the cooler unit 8 and serves also for preventing inadvertent withdrawal of the stopper member 18. In operation, when the cooler unit 8 is moved rearward horizontally and the stopper member 17 is moved to the rear end position (horizontal movement end portion) of the movement slot 82, and then, when the upper portion of the cooler unit 8 is tilted about the lower portion of the same rearwardly away from the engine 7, to move the hook member 17 in the withdrawing direction, the movement slot 82 inhibits inadvertent withdrawal of the stopper member 18, thus restricting the rearward tilting movement of the cooler unit 8.

Figure 14:
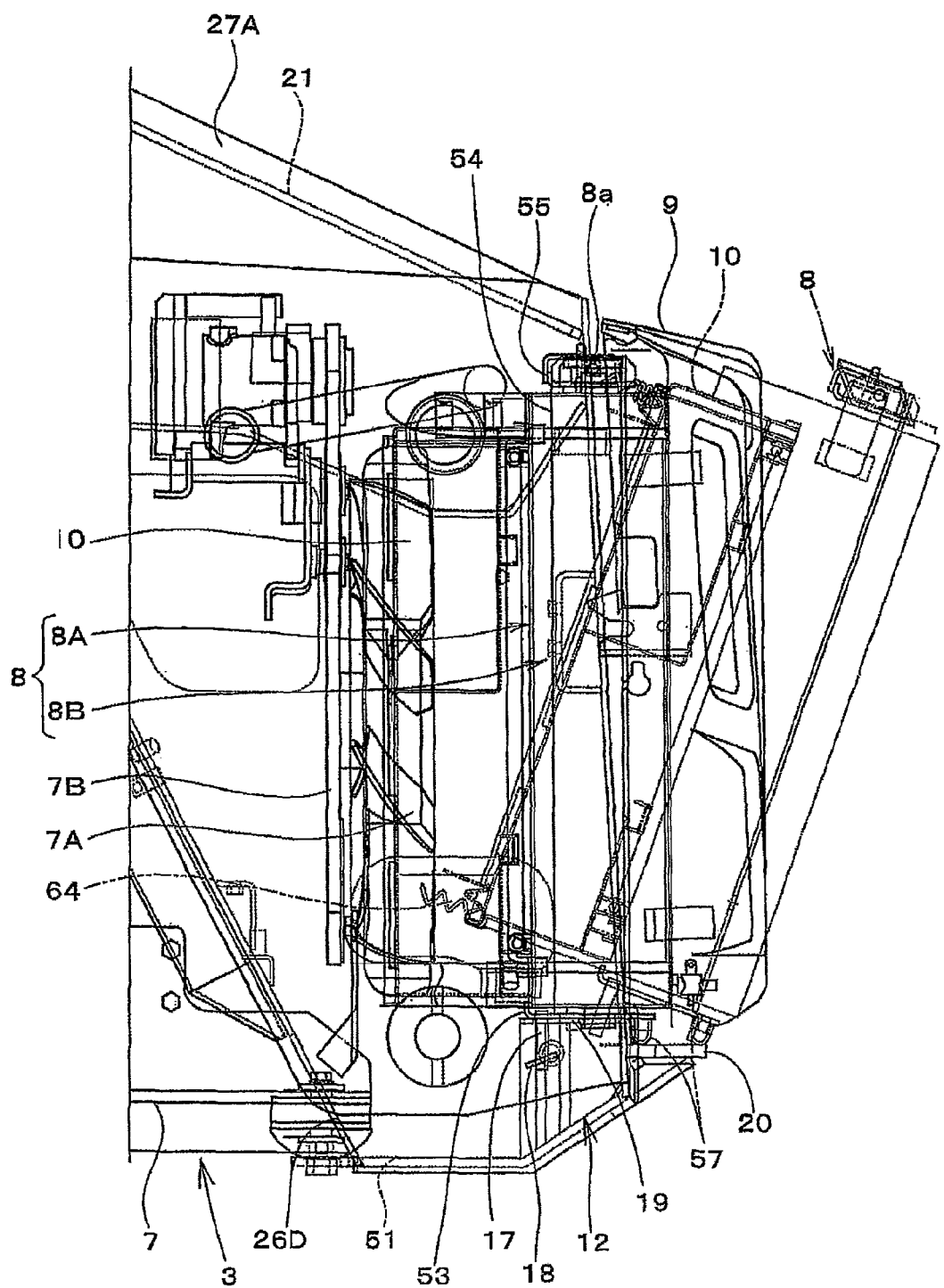
Figure 15:
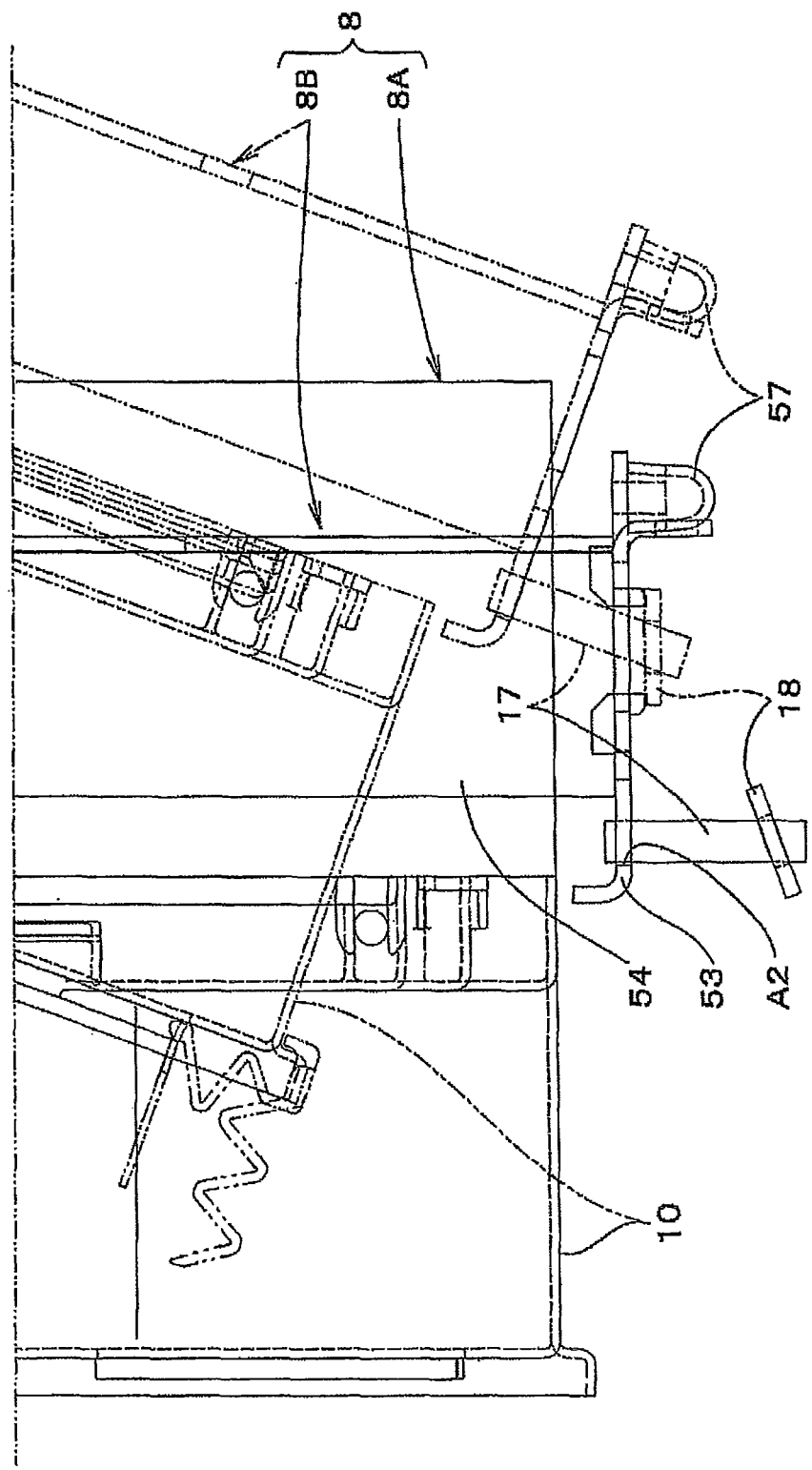
Figure 16:
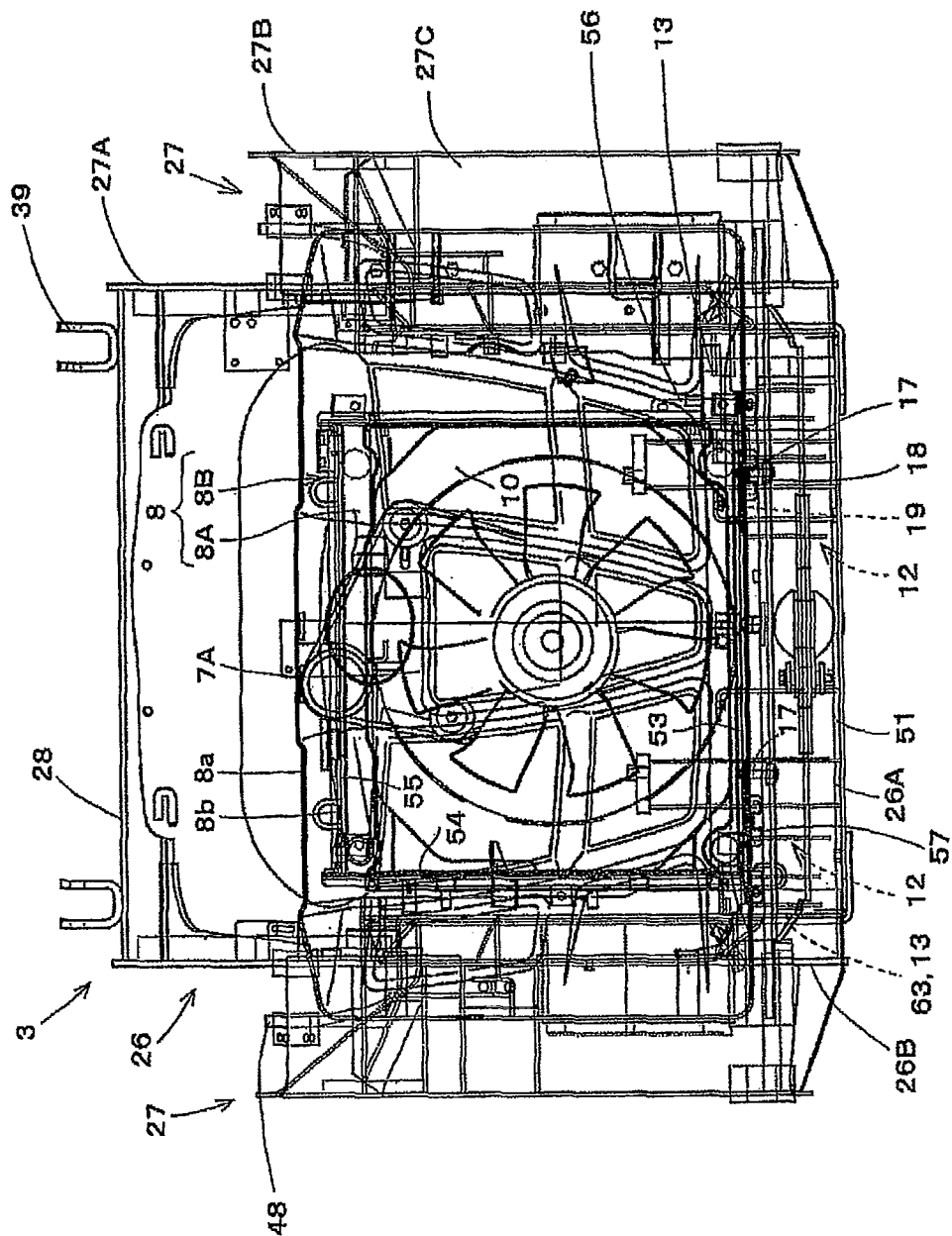
Figure 17:
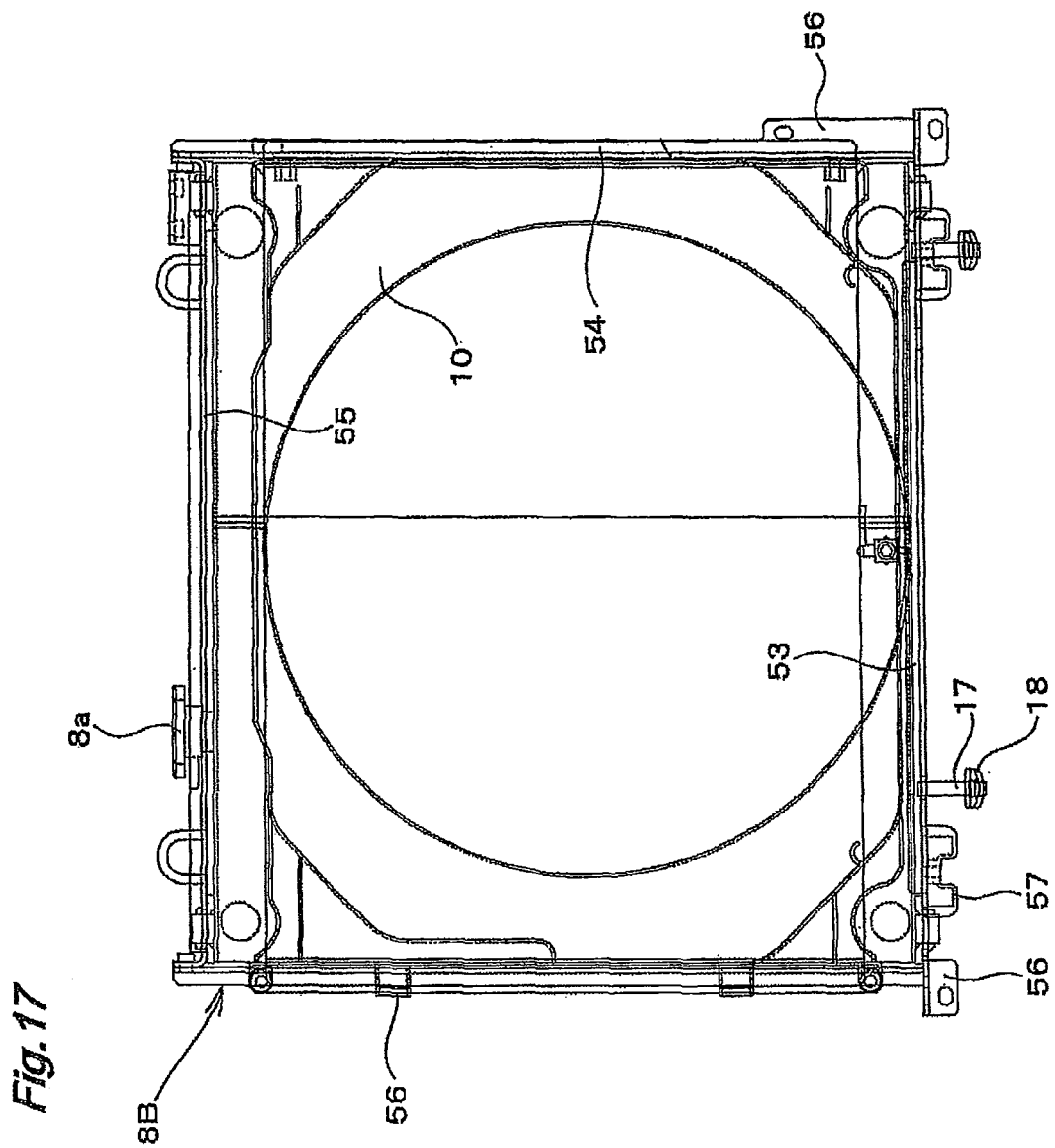
Figure 18:
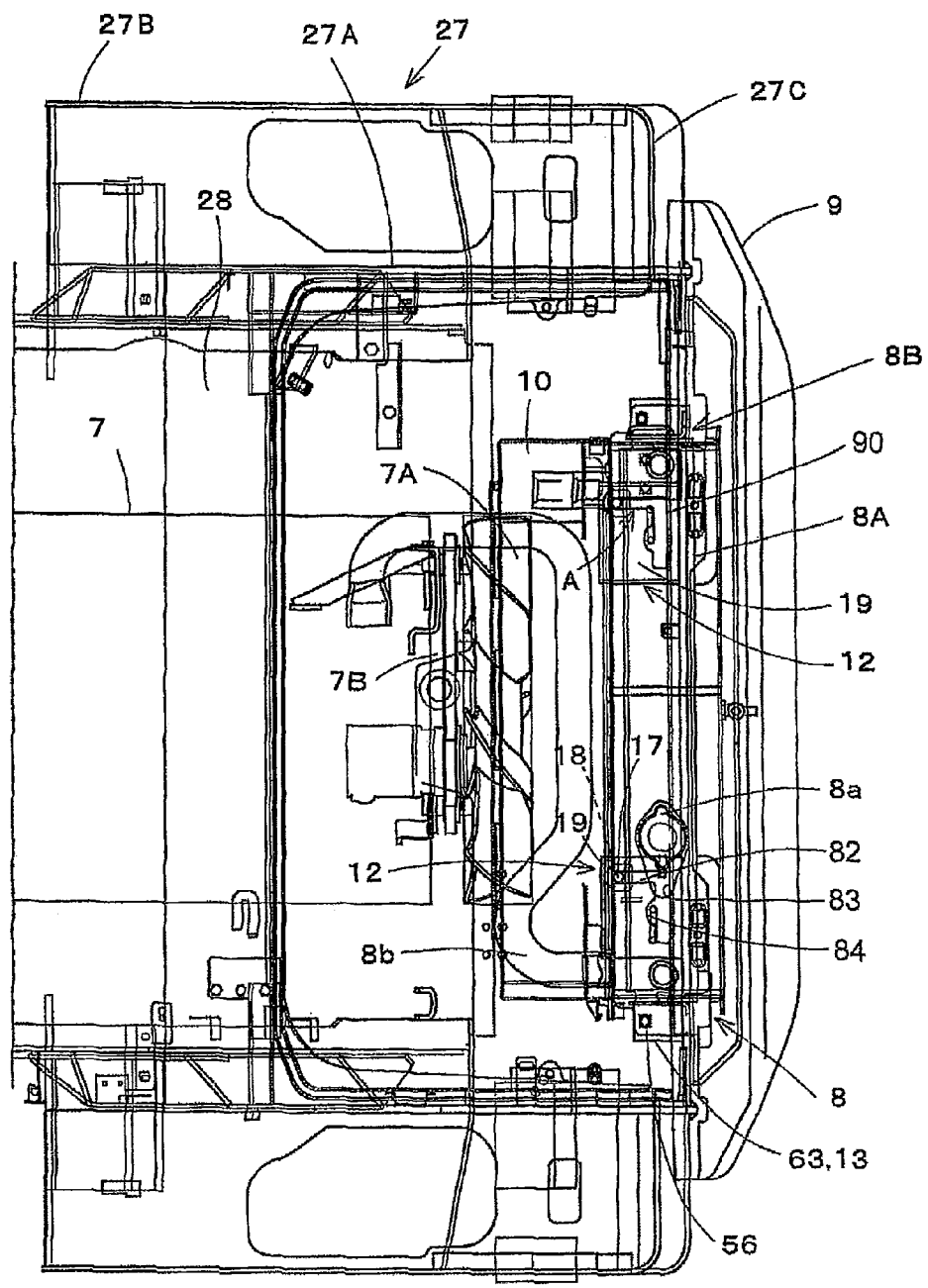

As shown by the virtual line in FIG. 14, the posture of the stopper member 18 in contact with the lower face of the guide horizontal plate 19 realizes the rearward tilting of the cooler unit 8, and the cooler unit 8 is maintained under this posture.

Therefore, as the movement slot 82 allows fore/aft horizontal movement (sliding) of the hook member 17, these members, i.e. the movement slot 82 and the hook member 17, together constitute the movement mechanism 80. And, the arrangement of inhibiting withdrawal of the stopper member 18 from the movement slot 82 while allowing the movement of the hook member 17 in the withdrawing direction constitutes the tilt mechanism 90 in cooperation with the hook member 17.

Figure 19:
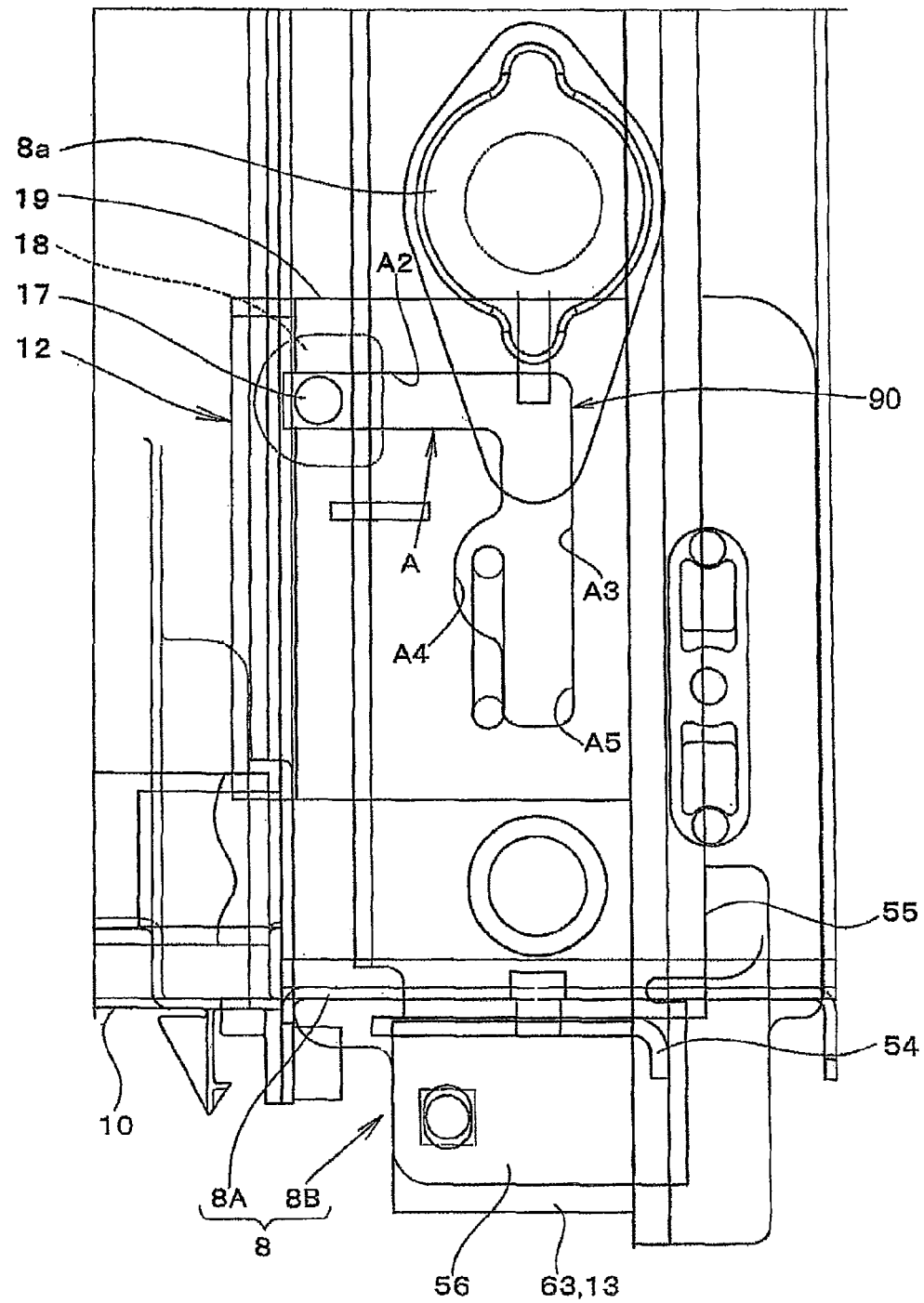

As shown in FIG. 19, the transverse movement slot 83, as being in communication with the movement end at the rear portion of the movement slot 82, allows right/left horizontal movement of the hook member 17, and this transverse movement slot 83 is capable of retaining the cooler unit 8 under the rearwardly tilted posture.

At a leading end of the transverse movement slot 83, there are formed a slot enlarged portion 4A and a depth receiving portion A5 for allowing insertion and withdrawal of the hook member 18.

The slot enlarged portion 4A has a similar shape to and is slightly larger than the stopper member 18. In operation, by elevating the stopper member 18 in opposition to the slot enlarged portion A4, the hook member 17 can be withdrawn from the guide horizontal plate 19 and the cooler unit 8 can be detached from the machine body frame 3.

The depth receiving portion A5 is an extension portion of the transverse movement slot 83 and is formed with a slot width not allowing withdrawal of the stopper member 18. When the hook member 17 is moved to this depth receiving portion A5, the depth receiving portion A5 serves to prevent withdrawal of the hook member 17. Thus, when the cooler unit 8 has slid maximally laterally, there is created a large space between the other end of the cooler unit 8 and the machine body frame 3 and at the same time the cooler unit 8 can be maintained under the rearwardly tilted posture.

The extension bottom plate 51 includes, on the right/left outer sides of the right and left support decks 12, auxiliary support decks 63 for supporting the cooler unit 8 over an increased width. Each auxiliary support deck 63 acts also as an attaching member 13 for bolt-fastening the stay 56 projecting from the cooler unit frame 8B.

When the hook member 17 enters the movement slot 82 from the transverse movement slot 83, the right/left position of the cooler unit 8 is fixed, so the hook member 17 and the movement slot 82 together constitute right/left positioning means for the cooler unit 8.

A seal member 64 shown in FIG. 14 comprises bellows and is configured to come into contact with a seal receiving member (not shown) fixed to the engine 7 provided at a position for surrounding the cooling fan 7A, thereby to allow the fan shroud 10 to be disposed at an appropriate position. With this, even when the cooler unit 8 is mounted again after movement, the chip clearance between the cooling fan 7A and the fan shroud 10 can be minimal, while preventing contact between the fan shroud 10 and the cooling fan 7A.

In this second embodiment, like the first embodiment, when the fixation by the attaching member 13 is released, the cooler unit 8 and the fan shroud 10 attached to this cooler unit 8 can be moved rearward horizontally from the engine 7 side via the movement mechanism 80. And, subsequent to this horizontal rearward movement, via the tilt mechanism 90, the upper portion of the cooler unit 8 can be tilted rearward away from the engine 7. And, during the horizontal rearward movement and the tilting movement, the carrier deck 20 downwardly of the machine body frame supports the rear lower portion of the cooler unit 20, thus ensuring stable horizontal movement.

Incidentally, the shapes and the fore/aft, right/left and upper/lower positional relationships of the respective components in the above embodiments are best when embodied as shown in FIGS. 1-22. The invention, however, is not limited to these embodiments. These components and their constructions as well as their combinations can vary in many ways.

For instance, the movement mechanism 80 and the tilt mechanism 90 can be used in a mounting construction for mounting the engine 7 and the cooler unit 8 to a work machine such as a backhoe, instead of the skid-steer loader, such that the engine 7 and the cooler unit 8 are mounted on the machine body frame 3 along the right/left direction, with the cooler unit 8 being horizontally movable in the right/left direction.

Further, the fan shroud 10 can be attached to the engine 7, rather than to the cooler unit 8 and the cooler unit 8 may be configured to be movable horizontally in the direction away from the engine 7 and the fan shroud 10, thus creating a space allowing maintenance between the cooler unit 8 and the fan shroud 10. Or, the cooler fan 7A can be configured as a suction type.

The support decks 12 can be disposed on the right and left sides of the cooler unit 8 and the movement mechanism 80 and the tilt mechanism 90 may be formed on the right and left sides of the cooler unit 8. And, the engaging member 14 or the hook member 17 can be provided in the cooler unit body 8A per se to be detachably attached to the attaching member 13. And, the bottom wall 26A and the extension bottom plate 51 may be formed of a single plate.

Third Embodiment

Figure 24:
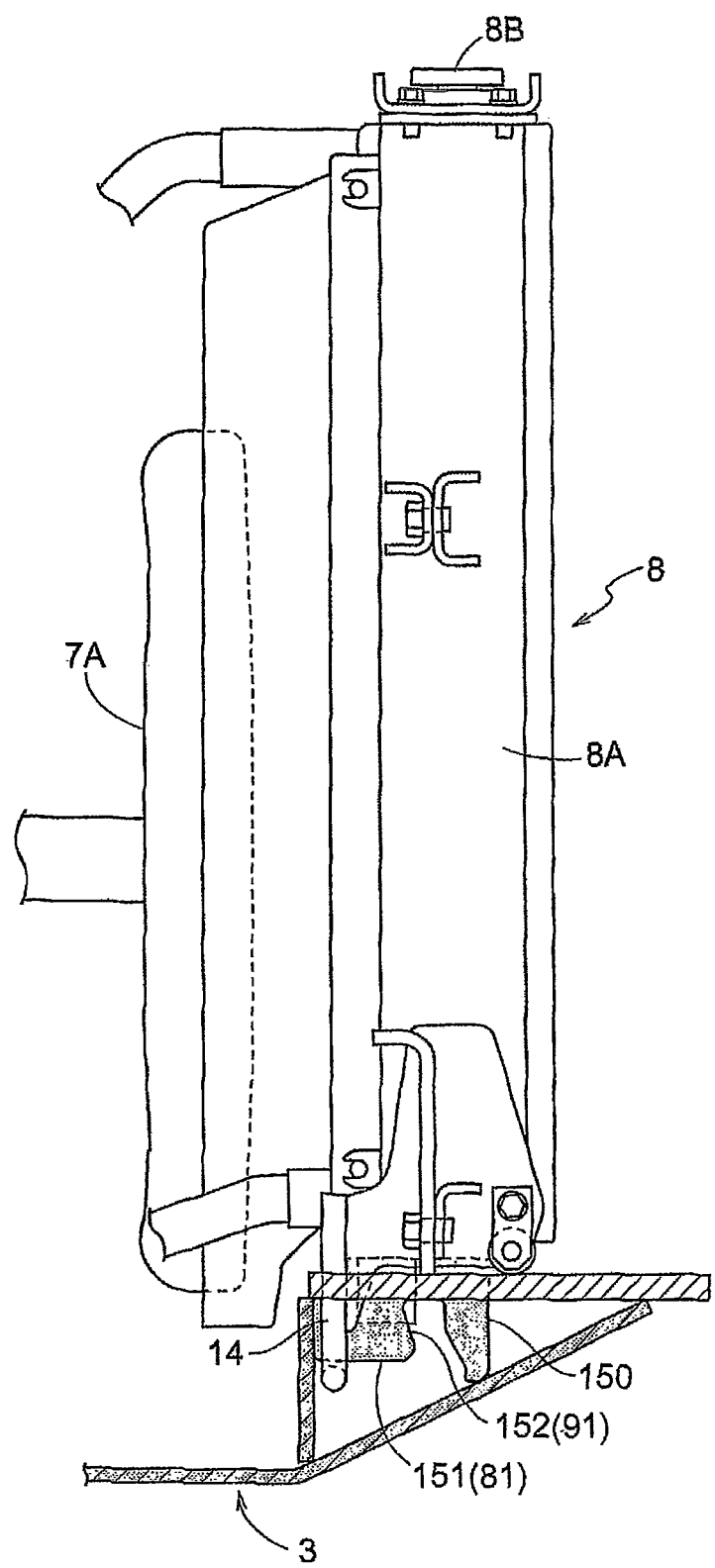
Figure 25:
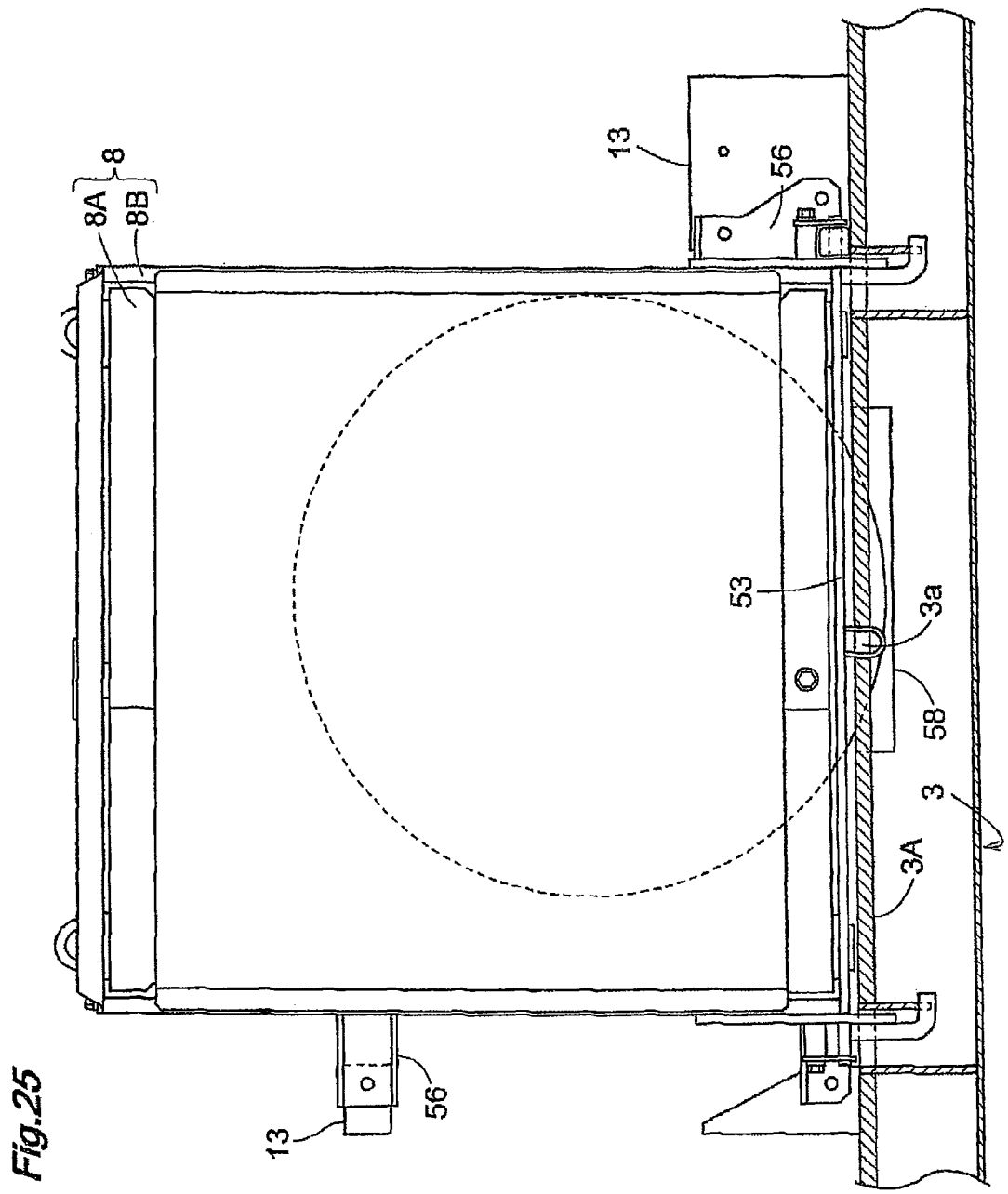

A cooler unit mounting arrangement according to a third embodiment of the invention will be described next with reference to FIG. 24, FIG. 25 and FIGS. 26A, B, C. The cooler unit mounting arrangement relating to this third embodiment largely differs from the foregoing embodiments in the following two respects.

(1) The engaging members 14 are provided with downward orientation at opposed end portions of the lower plate 53 of the cooler unit frame 8B. The positioning member 58 is fixed to the lower face of the lower plate 53 at its substantially right/left center. In this embodiment, this positioning member 58 is provided as a downwardly oriented projecting member bent in the U-shape. As the positioning member 58 is engaged in a through hole 3a defined in a floor plate 3A constituting the machine body frame 3, the positioning of the cooler unit 8 is realized.

(2) The slots such as the movement slot 81 and the tilt slot 91 formed in the guide vertical plate 15 so as to act as guides for the engaging member 14 in the foregoing embodiments, are formed as guide edges in this third embodiment. That is, in this embodiment, in the bottom face of the guide vertical plate 150, a first guide edge 151 (corresponding to the movement slot 81) for guiding the horizontal movement of the cooler unit 8 and a second guide edge 62 (corresponding to the tilt guide slot 91) for guiding the horizontal movement of the cooler unit 8 are formed continuously. More particularly, the shapes of these first guide edge 151 and second guide edge 152 are substantially shapes of the movement slot 81 and the tilt slot 91 modified with elimination therefrom their portions which are not directly needed for the guiding. Therefore, in this embodiment, the movement mechanism 80 is formed by the engaging member 14 and the first guide edge 151, and the tilt mechanism 90 is formed of the engaging member 14 and the second guide edge 152.

With the above, in this third embodiment too, with the function of the movement mechanism 80, the cooler unit 8 is moved in the direction away from the cooling fan 8A, that is, from the engine 7, and with the function of the tilt mechanism 90, about the lower portion of the cooler unit 8, the upper portion of the same is tilted away from the engine 7, whereby there is created a large upper space between the engine 7, the cooling fan 7A and the cooler unit 8, thus increasing ease of maintenance.

What is claimed is:

1. A mounting arrangement for mounting a cooler unit to a work machine including a traveling device, a machine body frame, an engine and the cooler unit disposed adjacent the engine, the arrangement comprising:
    a support deck provided in the machine body frame for supporting the cooler unit;
    an attachment unit for releasably fixing the cooler unit to the machine body frame;
    a movement mechanism provided between the cooler unit and the support deck, the movement mechanism allowing the cooler unit to effect a translational movement to change a distance relative to the engine;
    a tilt mechanism provided between the cooler unit and the support deck, the tilt mechanism allowing tilting of an upper portion of the cooler unit in the direction away from the engine after the transitional movement of this cooler unit away from the engine; and
    a carrier deck provided on the support deck remote from the movement mechanism and the tilt mechanism, the carrier deck having a sliding movement surface, the sliding movement surface having a sufficient length to carry a lower portion of the cooler unit during the transitional movement of the cooler unit away from the engine under assistance of the movement mechanism and the tilt mechanism.

2. The mounting arrangement for mounting a cooler unit to a work machine according to claim 1, wherein said translational movement comprises a horizontal movement.

3. The movement arrangement for mounting a cooler unit to a work machine according to claim 1, wherein the movement mechanism and the tilt mechanism are combined and integrated together as a movement/tilt mechanism.

4. The mounting claim arrangement for mounting a cooler unit to a work machine according to claim 1, wherein said cooler unit is disposed at a rear portion of the machine body frame, so that a rear portion of the cooler unit projects more rearward than a rear face of the machine body frame and a rear end of a room cover covering the upper side of the cooler unit.

5. The mounting arrangement for mounting a cooler unit to a work machine according to claim 1, wherein said cooler unit includes a cooling fan and a fan shroud surrounding the cooling fan, and the cooling fan and the fan shroud are movable together with the cooler unit.

6. The mounting arrangement for mounting a cooler unit to a work machine according to claim 1, wherein said sliding movement surface extends horizontal from the movement mechanism and the tilt mechanism in the direction away from the engine.

7. The mounting arrangement for mounting a cooler unit to a work machine according to claim 3, wherein said movement/tilt mechanism includes:
    an engaging member formed as a downward projection at a lower portion of the cooler unit;
    a guide vertical plate provided in the support deck;
    a movement slot defined in the guide vertical plate to be engageable with the engaging member for guiding the horizontal movement of the cooler unit; and
    a tilt slot defined in the guide vertical plate to be in communication with a movement end of the movement slot so as to allow the tilting movement of the upper portion of the cooler unit in the direction away from the engine, the tilt slot guiding an upward movement of the engaging member.

8. The mounting arrangement for mounting a cooler unit to a work machine according to claim 3, wherein said movement/tilt mechanism includes:
    a hook member formed as a downward projection at a lower portion of the cooler unit;
    a stopper member provided at a lower end of the hook member;
    a guide horizontal plate provided in the support deck; and
    a movement slot defined in the guide horizontal plate, the movement slot being engageable with the hook member for guiding the horizontal movement of the cooler unit, the movement slot restricting inadvertent withdrawal of the stopper member during the tilting movement of the cooler unit.

9. The mounting arrangement for mounting a cooler unit to a work machine according to claim 8, wherein said guide horizontal plate defines a transverse movement slot in communication with the movement end of the movement slot, said transverse movement slot guiding transverse movement of the hook member relative to the horizontal movement direction.

10. A mounting arrangement for mounting a cooler unit to a work machine including a traveling device, a machine body frame, an engine and the cooler unit disposed adjacent the engine, the arrangement comprising:
- a support deck provided in the machine body frame for supporting the cooler unit;
- an attachment unit for releasably fixing the cooler unit to the machine body frame;
- a movement mechanism provided between the cooler unit and the support deck, the movement mechanism allowing the cooler unit to effect a translational movement to change a distance relative to the engine;
- a tilt mechanism provided between the cooler unit and the support deck, the tilt mechanism allowing tilting of an upper portion of the cooler unit in the direction away from the engine after the transitional movement of this cooler unit away from the engine; and
- a carrier deck provided on the support deck remote from the movement mechanism and the tilt mechanism, the carrier deck carrying a lower portion of the cooler unit moved by the movement mechanism and the tilt mechanism;

wherein the movement mechanism and the tilt mechanism are combined and integrated together as a movement/tilt mechanism; and wherein said movement/tilt mechanism includes:
- a hook member formed as a downward projection at a lower portion of the cooler unit;
- a stopper member provided at a lower end of the hook member;
- a guide horizontal plate provided in the support deck; and
- a movement slot defined in the guide horizontal plate, the movement slot being engageable with the hook member for guiding the horizontal movement of the cooler unit, the movement slot restricting inadvertent withdrawal of the stopper member during the tilting movement of the cooler unit.

* * * * *